(12) United States Patent
Wells et al.

(10) Patent No.: US 12,203,581 B2
(45) Date of Patent: Jan. 21, 2025

(54) POLYMER PIPE, A PIPE JOINT INSERT DEVICE, A PIPE JOINT ASSEMBLY, AND METHODS OF FORMING SAME

(71) Applicant: North American Pipe Corporation, Houston, TX (US)

(72) Inventors: Andrew Wells, Wayne, PA (US); Joshua E. Clapper, Downingtown, PA (US)

(73) Assignee: Westlake Pipe & Fittings Corporation, Houston, TX (US)

( * ) Notice: Subject to any disclaimer, the term of this patent is extended or adjusted under 35 U.S.C. 154(b) by 183 days.

(21) Appl. No.: 17/148,523

(22) Filed: Jan. 13, 2021

(65) Prior Publication Data

US 2021/0278025 A1    Sep. 9, 2021

Related U.S. Application Data

(60) Provisional application No. 63/117,148, filed on Nov. 23, 2020, provisional application No. 62/960,451, filed on Jan. 13, 2020.

(51) Int. Cl.
| | |
|---|---|
| *F16L 47/08* | (2006.01) |
| *B29C 57/02* | (2006.01) |
| *B29C 57/04* | (2006.01) |
| *F16L 21/03* | (2006.01) |
| *F16L 47/10* | (2006.01) |
| *F16L 47/12* | (2006.01) |
| *B29L 31/24* | (2006.01) |

(52) U.S. Cl.
CPC ............ *F16L 47/08* (2013.01); *B29C 57/025* (2013.01); *B29C 57/04* (2013.01); *F16L 21/03* (2013.01); *F16L 47/10* (2013.01); *F16L 47/12* (2013.01); *B29L 2031/24* (2013.01)

(58) Field of Classification Search
CPC ........... F16L 21/03; F16L 47/08; F16L 47/10; F16L 47/12
See application file for complete search history.

(56) References Cited

U.S. PATENT DOCUMENTS

| | | |
|---|---|---|
| 4,111,464 A | 9/1978 | Asano |
| 4,134,949 A | 1/1979 | Mcgregor |
| 4,693,483 A | 9/1987 | Valls |

(Continued)

FOREIGN PATENT DOCUMENTS

| | | |
|---|---|---|
| EP | 1471298 A1 | 10/2004 |

OTHER PUBLICATIONS

Ritu, "Plastic Overmolding: All you need to know", Unipipes, https://www.unipipes.com/blog/plastic-overmolding; Aug. 2019, 10 pp.

Office Action cited in U.S. Appl. No. 17/148,520; Feb. 1, 2023; 15 pp.

International Search Report and Written Opinion cited in PCT app. No. PCT/US21/13326; Mar. 26, 2021; 9pp.

(Continued)

*Primary Examiner* — Zachary T Dragicevich
(74) *Attorney, Agent, or Firm* — LEMPIA SUMMERFIELD KATZ LLC

(57) ABSTRACT

A polymer pipe has a length between a first end and a second end. The length and the first end have a first diameter and the second end is a belled end having a second diameter larger than the first diameter. An insert device is received within the second end and has an annular body and a spline groove formed in the annular body and facing radially inward. The insert device is pre-installed in the belled end during the belling process.

15 Claims, 24 Drawing Sheets

(56) References Cited

U.S. PATENT DOCUMENTS

| | | | |
|---|---|---|---|
| 4,826,028 | A | 5/1989 | Vassallo et al. |
| 4,834,430 | A * | 5/1989 | Vassallo ................. F16L 47/10 |
| 6,277,315 | B1 | 8/2001 | Haallstedt |
| 7,134,204 | B2 | 11/2006 | Corbett, Jr. et al. |
| 7,252,293 | B2 | 8/2007 | Happel |
| 7,284,310 | B2 | 10/2007 | Jones |
| 7,845,686 | B2 | 12/2010 | Steinbruck |
| 8,444,186 | B2 | 5/2013 | Jones et al. |
| 9,400,071 | B1 * | 7/2016 | Copeland ................. F16L 21/03 |
| 9,951,869 | B2 | 4/2018 | Lopez-chaves |
| 10,107,425 | B2 | 10/2018 | Corbett, Jr. et al. |
| 10,876,672 | B2 | 12/2020 | Quesada |
| 11,098,832 | B2 | 8/2021 | Clapper |
| 2001/0040376 | A1 | 11/2001 | Metcalfe et al. |
| 2009/0152863 | A1 | 6/2009 | Steinbruck |
| 2016/0245435 | A1 | 8/2016 | Corbett, Jr. et al. |
| 2017/0087760 | A1 | 3/2017 | Copeland |
| 2017/0198847 | A1 | 7/2017 | Clapper et al. |
| 2018/0224041 | A1 | 8/2018 | Clapper et al. |
| 2020/0292109 | A1 * | 9/2020 | Quesada ................. F16L 21/03 |

OTHER PUBLICATIONS

International Search Report and Written Opinion cited in corresponding PCT app No. PCT/US21/13328; Mar. 25, 2021; 9pp.

Office Action cited in U.S. Appl. No. 17/148,520; Aug. 29, 2023; 17 pp.

Dictionary, "Through", "https://www.dictionary.com/browse/through"; 1 pp.

European Search Report of the European Patent Office cited in European patent application No. EP 21741821.9; Jan. 25, 2024; 14 pp.

European Search Report of the European Patent Office cited in European patent application No. EP 21741871.4; Jan. 25, 2024; 13 pp.

Office Action cited in the U.S. Appl. No. 17/148,520; Jan. 18, 2024; 17 pp.

Office Action cited in the Canadian patent application No. 3,164,722; Apr. 2, 2024; 3 pp.

Office Action cited in the Canadian patent application No. 3,164,724; Apr. 4, 2024; 3 pp.

Office Action cited in U.S. Appl. No. 17/148,520; Sep. 9, 2024; 18 pp.

* cited by examiner

POLYMER PIPE, A PIPE JOINT INSERT DEVICE, A PIPE JOINT ASSEMBLY, AND METHODS OF FORMING SAME

RELATED APPLICATION DATA

This patent is entitled to the benefit of and claims priority to U.S. Provisional Application Ser. No. 62/960,451 filed Jan. 13, 2020 and 63/117,148 filed Nov. 23, 2020, and each entitled "Pipe Joint Insert Device, Pipe Joint Assembly, and Methods of Forming Same." The entire contents of these prior filed provisional applications are hereby incorporated herein by reference.

BACKGROUND

1. Field of the Disclosure

The present disclosure is generally directed to pipe joints, and more particularly to pipe joint insert devices and pipe joint assemblies using such insert devices, and to methods utilizing and incorporating such insert devices in pipe joints.

2. Description of Related Art

Pipe sections are joined to one another at joints to form extended lengths of pipe. Non-metallic pipe, such as polyvinyl chloride (PVC) pipe often uses mechanical locking structures, such as splines, to form the joints. Conventional spline-type, restrained pipe joint systems typically have spline grooves and separate seals that are axially spaced-apart from the splines in a pipe joint. The spline grooves and seal grooves are typically machined into the inner surface of a pipe end and the seals are typically installed separately within a pipe end as well.

Manufacturing costs are relatively high since the spline grooves and seal parts must also be separately manufactured. Additional manpower and/or time and effort are also required, both to manufacture the separate parts and to install the separate parts in a pipe joint. Examples of such designs are disclosed and described in U.S. Pat. Nos. 5,662,360, 7,284,310, and 7,537,248. Some users would benefit from improvements in restrained pipe joints, spline arrangements, pipe joint assemblies, and corresponding methods. Thus, improvements in restrained pipe joints, insert devices, and joint locking components continue to be of interest.

SUMMARY

In one example, according to the teachings of the present disclosure, a polymer pipe has a length between a first end and a second end. The length and the first end have a first diameter and the second end is a belled end having a second diameter larger than the first diameter. An insert device is received within the second end. The insert device has an annular body and a spline groove formed in the annular body and facing radially inward.

In one example, the polymer pipe can include one or more insert recesses formed in an inside diameter (ID) surface of the second end and the annular body is seated in the one or more insert recesses.

In one example, the one or more insert recesses can result from a belling process at the second end of the pipe.

In one example, the annular body can be a molded element and a material of the annular body can be substantially rigid.

In one example, the polymer pipe can include a second pipe joined to the polymer pipe. The second pipe can have one end installed in the second end of the polymer pipe to form a pipe joint assembly.

In one example, the second pipe can have a mating spline groove on the OD surface that is axially aligned with the spline groove in the annular body of the insert device.

In one example, the polymer pipe can include a spline received in the spline groove and the mating spline groove to retain the polymer pipe and the second pipe joined to one another.

In one example, the annular body of the insert device can be formed of a polymer material.

In one example, the insert device can have an ID in a range of about 3 inches to about 48 inches and an axial length of about 0.125 inches to about 3 inches.

In one example, the annular body can include a spline portion including the spline groove.

In one example according to the teachings of the present disclosure, a method of forming a polymer pipe is provided. The polymer pipe has a length between a first end and a second end, the length and the first end have a first diameter, and the second end is a belled end having a second diameter larger than the first diameter. The method includes forcing a mandrel into the second end, when heated, of the polymer pipe to expand the diameter to the second diameter. The method includes providing or placing an insert device on an outside diameter (OD) surface of the mandrel to be received within the second end. The insert device has an annular body and a spline groove formed in the annular body and facing radially inward. The method includes cooling the second end of the polymer pipe around the insert device thereby forming the insert recesses.

In one example, the method can include using a stripper plate in conjunction with the mandrel to position the insert device relative to the mandrel and the second end of the polymer pipe.

In one example, the step of cooling can be done before the mandrel is removed from the second end of the polymer pipe and a vacuum can be applied to pull or draw the second end of the polymer pipe radially toward the mandrel.

In one example according to the teachings of the present disclosure, an insert device is provided for a belled end of a polymer pipe. The insert device includes an annular body and a spline groove formed by the annular body and is configured to be pre-installed in a belled end of a polymer pipe as the belled end is formed. The insert device can vary in configuration and construction according to any combination of the one or more features, aspects, and characteristics as disclosed and described herein.

In one example according to the teachings of the present disclosure, a pipe joint assembly includes a polymer pipe having a length between a first end and a second end. The length and the first end have a first diameter and the second end is a belled end having a second diameter larger than the first diameter. An insert device is received within the second end and has an annular body and a spline groove formed in the annular body and facing radially inward. A second pipe has one end installed in the second end of the polymer pipe and has a mating spline groove on an outside diameter (OD) surface that is axially aligned with the spline groove in the annular body of the insert device. A spline is received in the spline groove and the mating spline groove axially joining the polymer pipe and the second pipe.

In one example, the polymer pipe, the second pipe, the spline, and the insert device can each be entirely non-metallic.

In one example according to the teachings of the present disclosure, a method of assembling a pipe joint includes providing a first pipe having a spigot end and providing a second pipe having a belled end. The belled end of the second pipe is sized to receive therein the spigot end of the first pipe. A mating spline groove is provided on an outside diameter (OD) of the first pipe. An insert device is installed and seated in and retained within the belled end. The insert device including an annular body defining a spline groove facing radially inward. The spigot end of the first pipe is inserted into the belled end of the second pipe such that the mating spline groove is axially aligned with the spline groove in the annular body. A spline is inserted into the spline groove and the mating spline groove to axially retain the first and second pipes joined to one another In one example according to the teachings of the present disclosure, a pipe system includes a polymer pipe having a length between a first end and a second end. The length and the first end have a first diameter and the second end is a belled end having a second diameter larger than the first diameter. One or more insert recesses are formed in an inside diameter (ID) surface of the belled end of the polymer pipe. An insert device is received within the belled end and has an annular body with an outside diameter (OD) surface seated in the one or more insert recesses and has a spline groove formed in the annular body and facing radially inward.

In one example, the pipe system can include a second pipe having a spigot end installed in the belled end of the polymer pipe. The second pipe can have a mating spline groove on an OD surface that is axially aligned with the spline groove in the annular body of the insert device. A spline is received in the spline groove and the mating spline groove and the spline axially joins the polymer pipe and the second pipe.

BRIEF DESCRIPTION OF THE DRAWINGS

The drawings provided herewith illustrate one or more examples or embodiments of the disclosure and therefore should not be considered as limiting the scope of the disclosure. There may be other examples and embodiments that may be equally effective to achieve the objectives and that may fall within the scope of the disclosure. Objects, features, and advantages of the present invention will become apparent upon reading the following description in conjunction with the drawing figures, in which.

The use of the same reference numbers or characters throughout the description and drawings indicates similar or identical components, aspects, and features of the disclosure.

DETAILED DESCRIPTION OF THE DISCLOSURE

The disclosure describes and shows various embodiments and examples of pipe joint insert devices, pipe joint spline grooves, pipe joint assemblies, and methods of making and assembling such insert devices, spline grooves, and assemblies. The disclosed embodiments solve or improve upon the above-mentioned and/or other problems and disadvantages with prior known pipe joint components and solutions. Objects, features, and advantages of the disclosed embodiments and examples will become apparent to those having ordinary skill in the art upon reading this disclosure.

Figure 1:
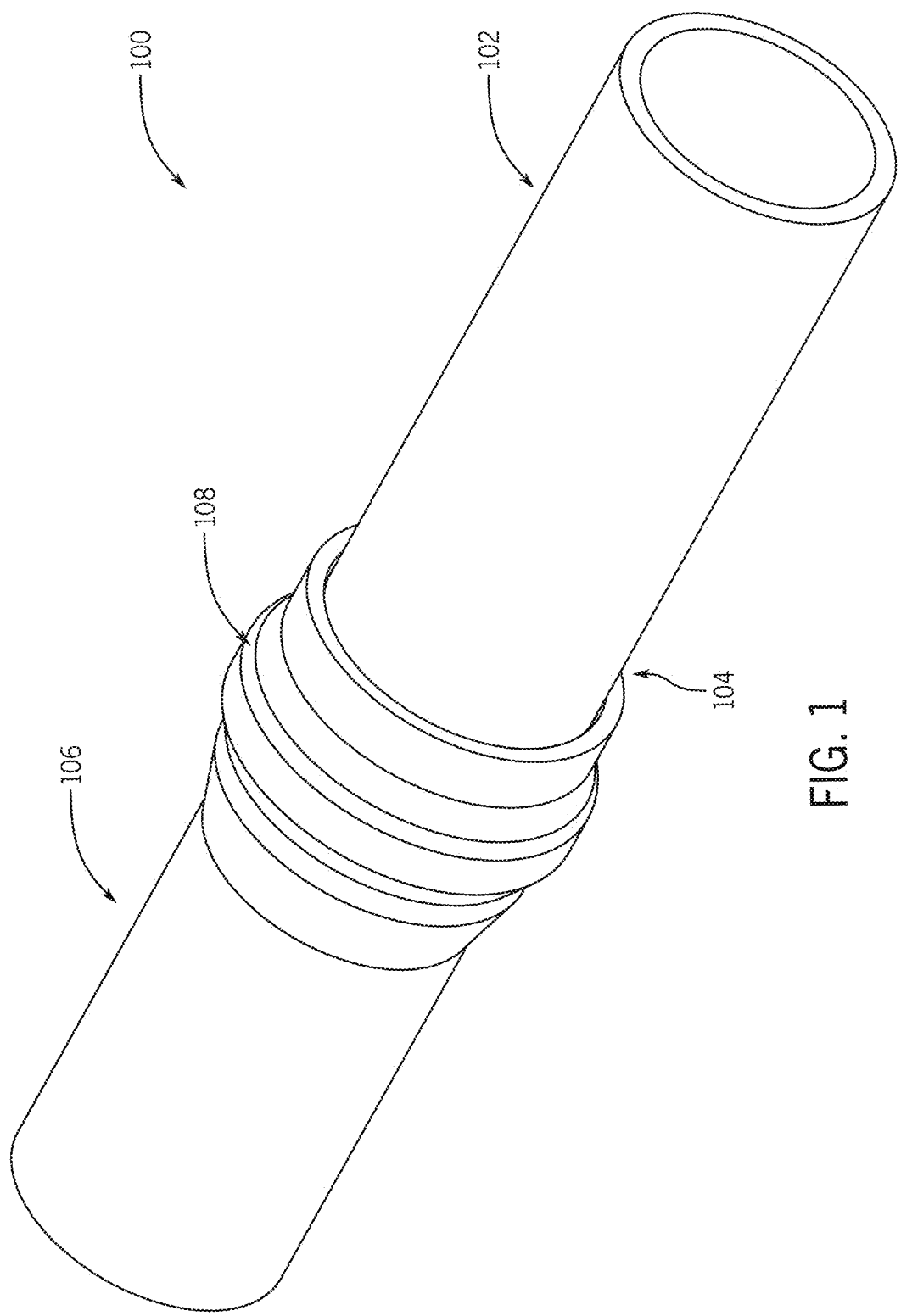
FIG. 1 shows a perspective view of one example of a pipe joint assembly constructed in accordance with the teachings of the present disclosure.
Figure 2:
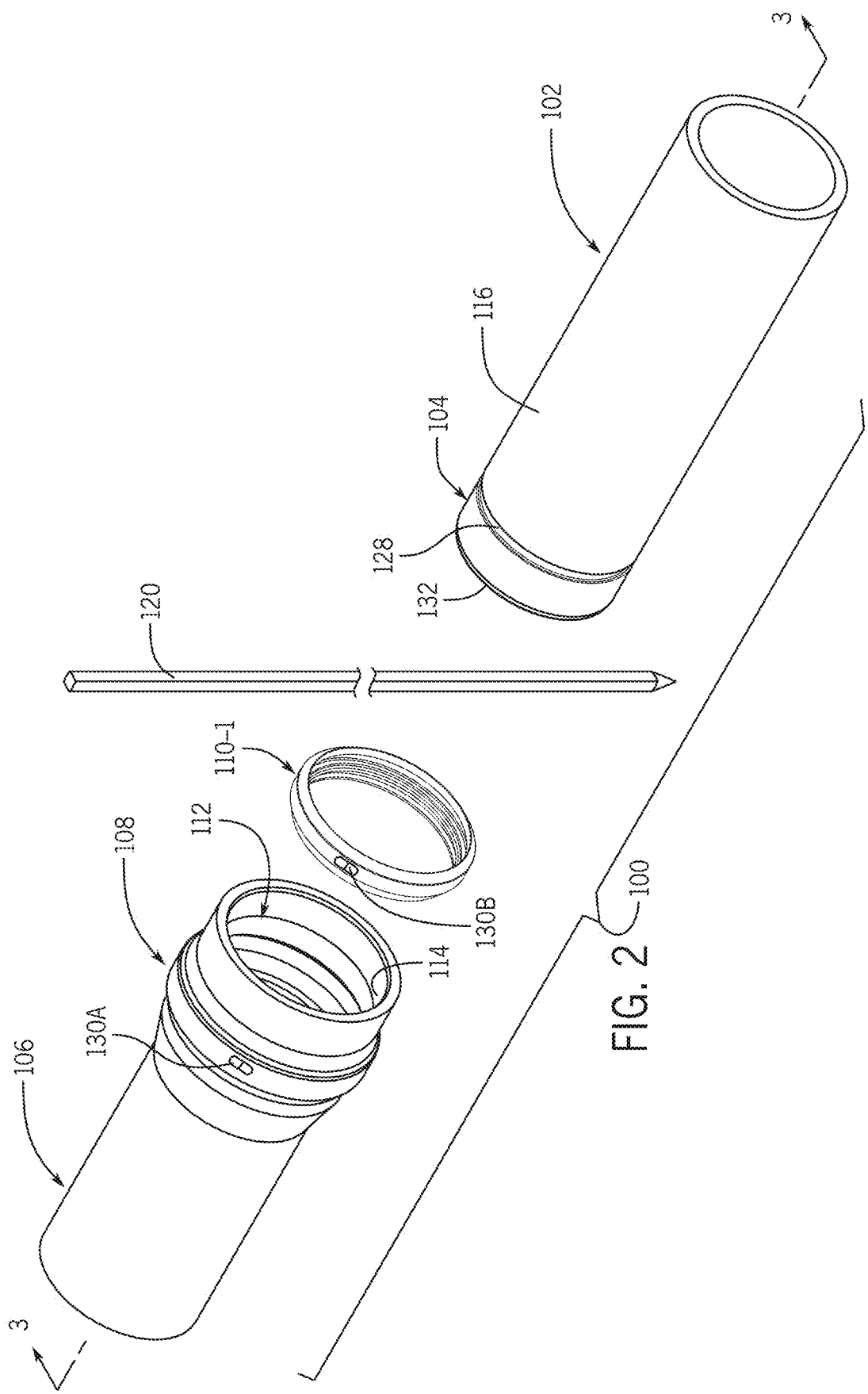
FIG. 2 shows an exploded view of the pipe joint assembly of FIG. 1 including an insert device constructed in accordance with the teachings of the present disclosure.

Turning now to the drawings, FIGS. 1 and 2 illustrate a one example of a pipe joint assembly 100 constructed in accordance with the teachings of the present disclosure. In this example, the pipe joint assembly 100 has two pipes joined to one another at the pipe joint assembly. A first pipe 102 of the two pipes has a male end or spigot 104 that may have an inside diameter (ID), a wall thickness, and an outside diameter (OD) that essentially match those of the majority of a length of the first pipe. A second pipe 106 of the two pipes has a belled end 108, i.e., a female end or socket into which the male end or spigot 104 of the first pipe 102 is received. The female end or belled end 108 of the second pipe 106 is formed, i.e., belled to have a larger ID and OD compared to those of the majority of the length of the second pipe and compared to those of the male end or spigot end 104 of the first pipe 102.

Figure 3:
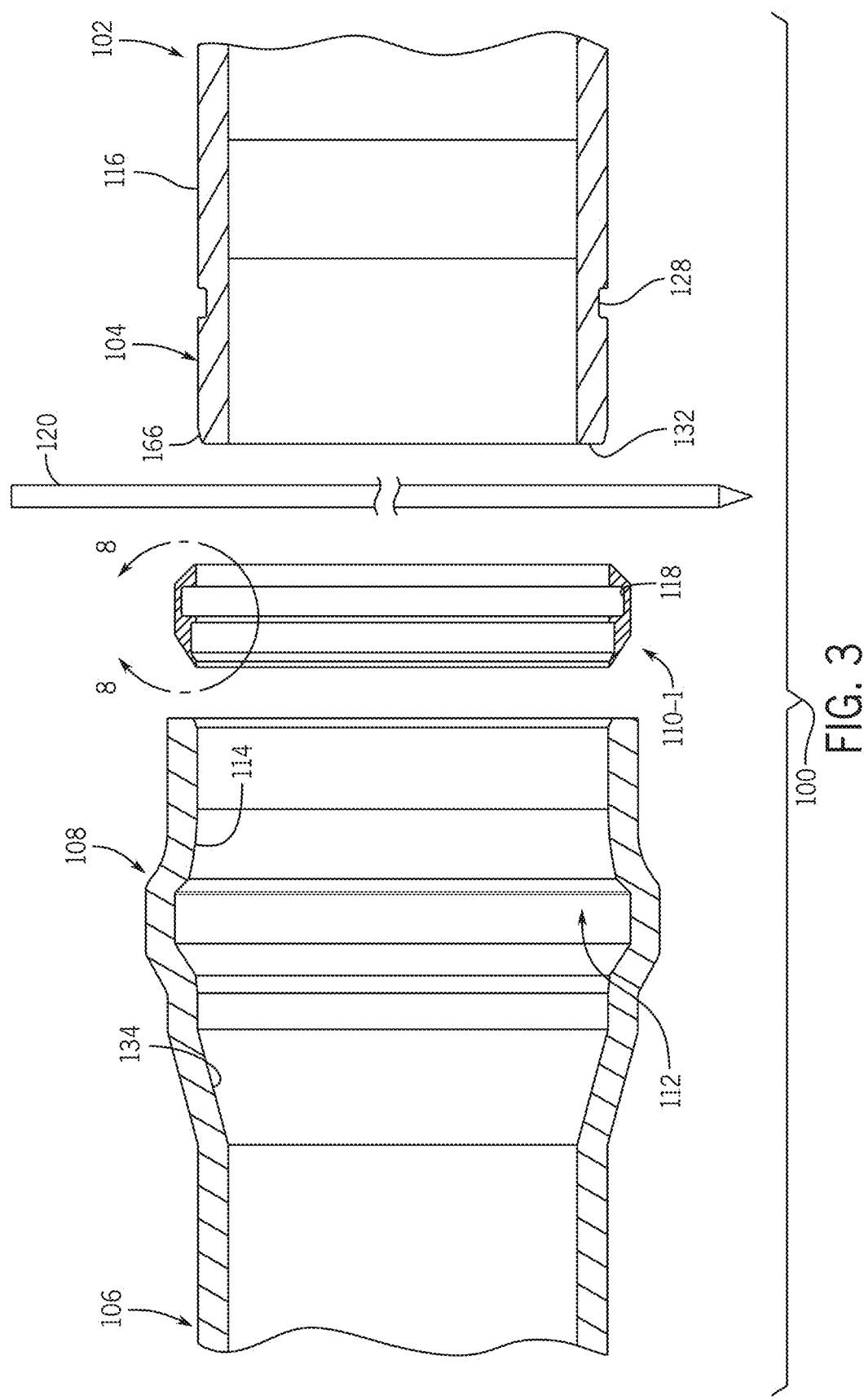
FIG. 3 shows a cross-section view taken along line 3-3 of the pipe joint assembly of FIG. 2.

As discussed further below in more detail, the female or belled end 108 of the second pipe 106 is also formed to include an insert device 110-1 installed between the first pipe 102 and second pipe in the pipe joint assembly 100. The insert device 110-1 can be called a cartridge, an insert cartridge, a groove former, a spline groove cartridge, a spline groove insert, or some other suitable term. Referring to FIG. 3, in one example, one or more insert recess or grooves 112 may be formed on an inside surface 114 of the belled end 108 of the second pipe 106. The one or more grooves 112 on the pipe inside surface 114 may be formed during the belling process while forming the female or belled end 108 of the second pipe 106, as described further below. The insert device 110-1 is disposed between an outside surface 116 of the first pipe 102 and the inside surface 114 of the second pipe 106 in the pipe joint assembly 100.

In the embodiments disclosed and described herein, the insert device 110-1 creates or is implemented to create a spline groove 118 in one of the two pipes 102, 106 for receiving a spline 120, which interlocks the two pipes together at the pipe joint assembly 100. The insert device 110-1 in the embodiments disclosed and described herein creates the spline groove 118 in one of the two pipes. In the disclosed examples or embodiments of the pipe joint assembly 100, aspects of the insert device 110-1 can be modified and the device substituted according to alternative embodiments of the insert devices disclosed and described below.

Figure 6:
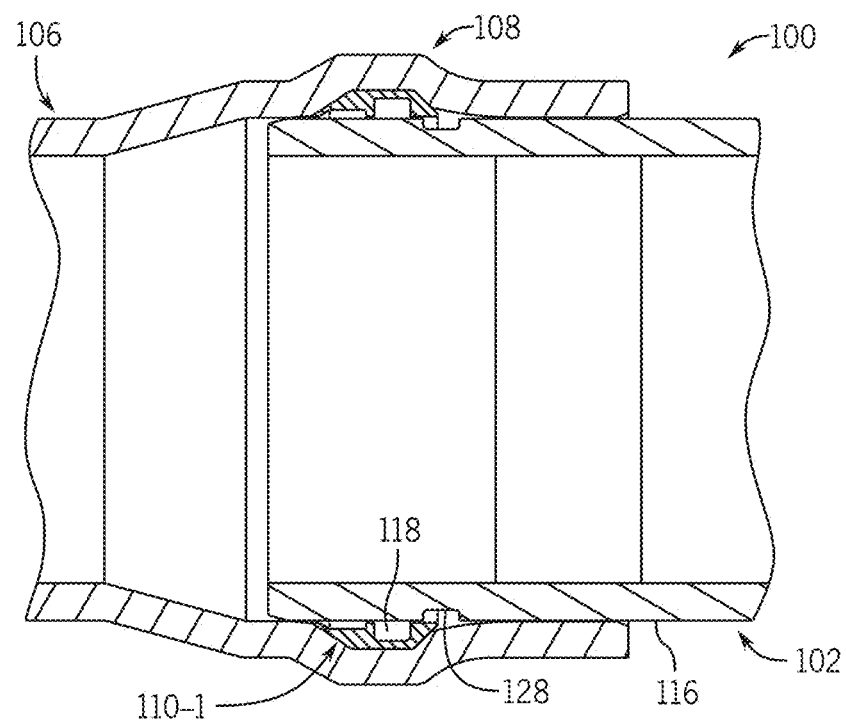
Figure 7:
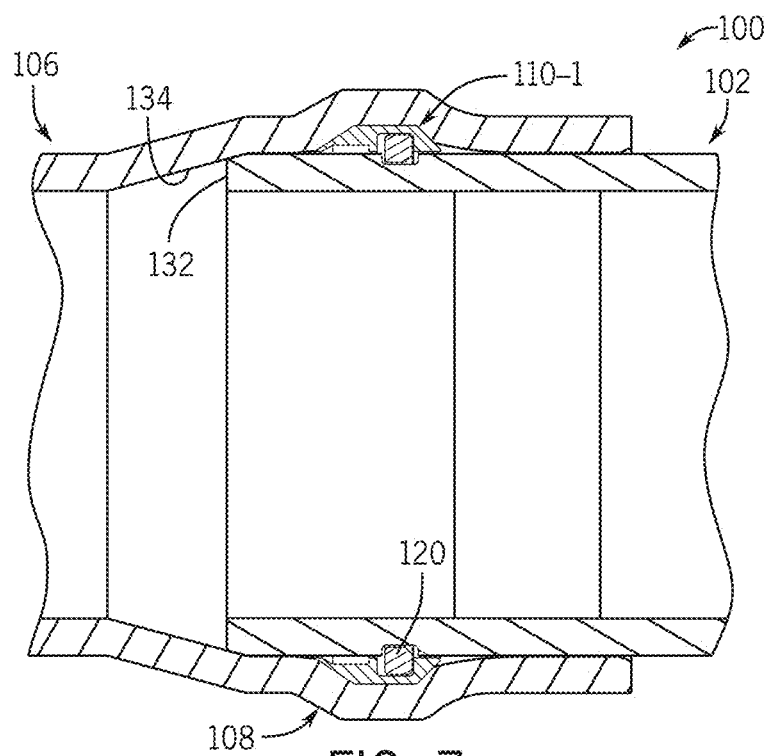
Figure 8:
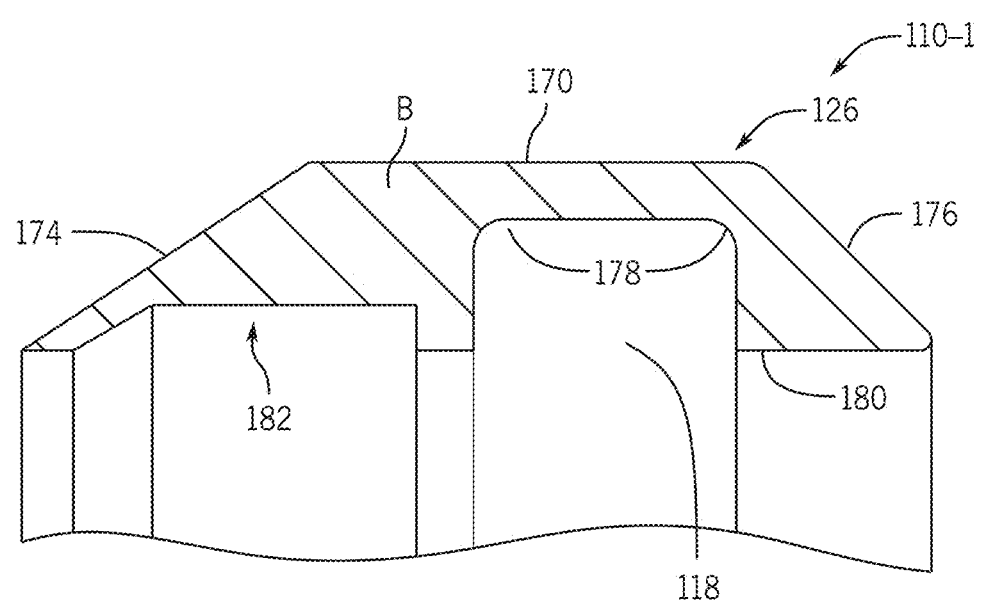
FIG. 8 shows a close up cross-section view of a portion taken from line 8-8 of the insert device of FIG. 3 depicting one example of an insert device constructed in accordance with the teachings of the present disclosure.

FIGS. 4-7 show the pipe joint assembly 100 of FIGS. 1-3 in various stages of assembly. In this example, the spline 120 of pipe joint assembly 100 is a standard extruded spline and the insert device 110-1, as depicted in FIG. 8, includes a body B with a spline groove portion 126. In this example, the spline groove 118 is formed in the spline groove portion 126 having a single depth. The belled end 108 of the second pipe 106 is formed using the below described forming process with the insert device 110-1 pre-disposed or pre-installed within the belled end. The spigot 104 of the first pipe 102 is formed having a spline groove 128 in the OD surface 116. The insert device 110-1 and the belled end 108 of the second pipe 106 each have corresponding spline insertion holes 130a, 130b. Each insertion hole 130a, 130b is provided at a tangential angle and are aligned circumferentially or rotationally with one another and aligned axially with the spline groove 118 in the insert device 110-1.

Figure 4:
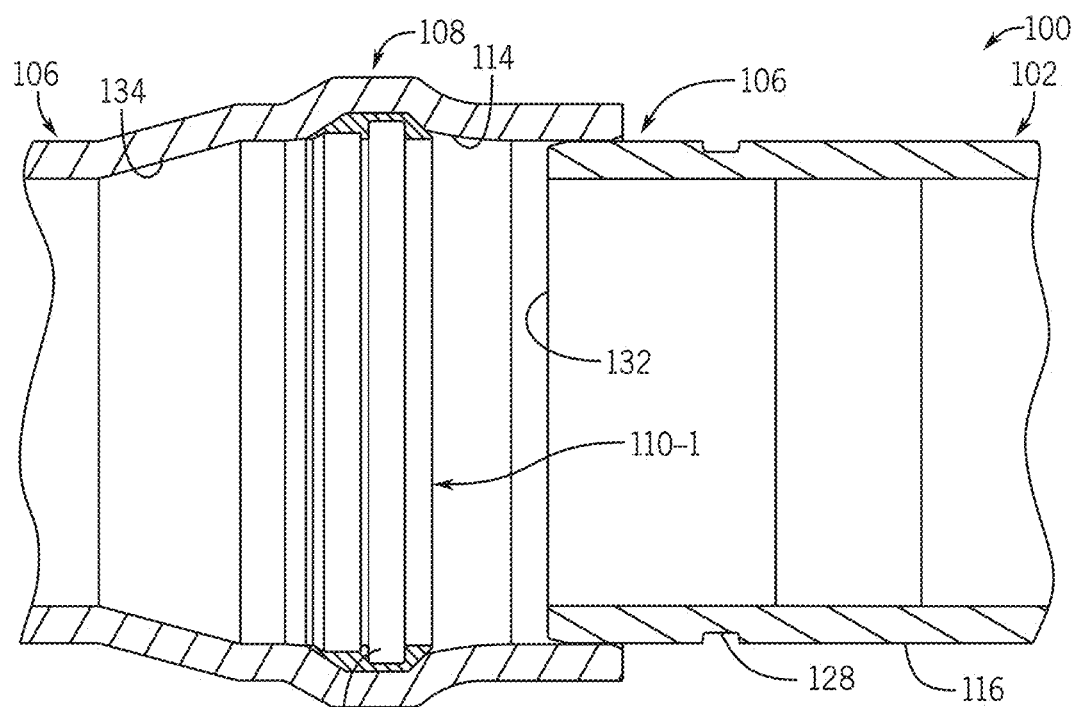
FIGS. 4-7 show views of the pipe joint assembly of FIG. 3 in progressive stages of being assembled.
Figure 5:
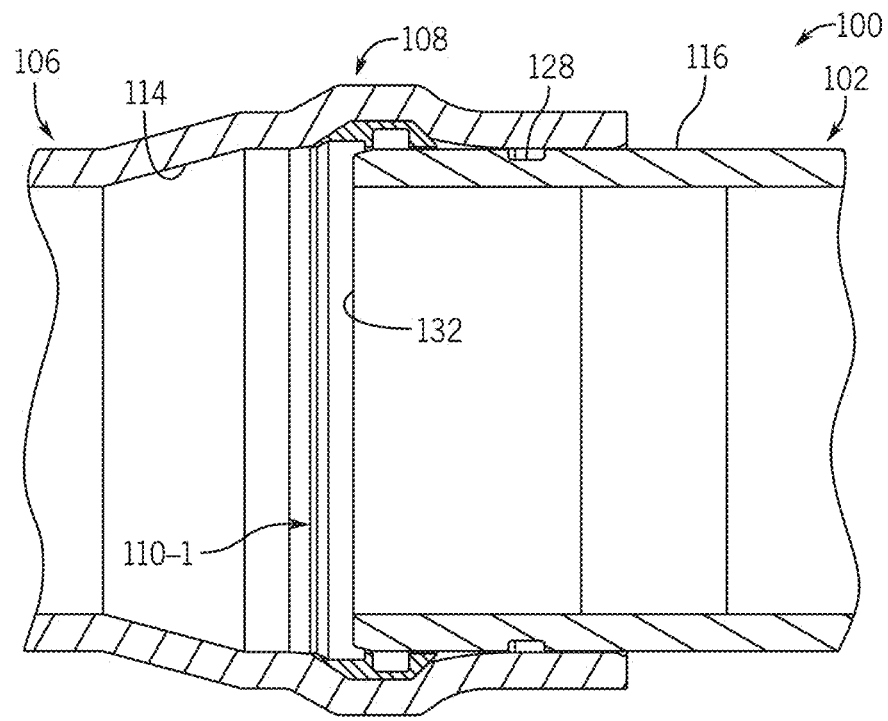

To assemble the pipe joint assembly 100, the spigot 104 of the first pipe 102 is inserted into the belled end 108 of the second pipe 106 and is pushed axially inward, as shown in FIGS. 4-6. The distal end 132 of the spigot 104 can abut an angled wall 134 or a stop in the belled end 108 of the second pipe 106. The positioning of the distal end 132, the angled wall 134, and the spline grooves 118 and 128 can be configured so that the two spline grooves automatically align with one another, as shown in FIG. 7. Alternatively, the extruded spline 120 may be used to determine, by being unblocked when pushed into the two insertion holes 130a, 130b in the insert device 110-1 and belled end 108 with the two pipes 102, 106 in the positions of FIGS. 4-6, and by being unblocked when the two spline grooves 118, 128 are aligned in the position of FIG. 7. The extruded spline 120 is then manually pushed into the aligned grooves 118, 128 via the insertion holes 130a, 130b to seat in the grooves, as depicted in FIG. 7. Once inserted, the spline 120 being captured within the two spline grooves 118, 128 and being taller in a radial direction than the depth of either groove prevents the two pipes 102, 106 from being pulled apart, as shown in FIG. 7.

Figure 9:
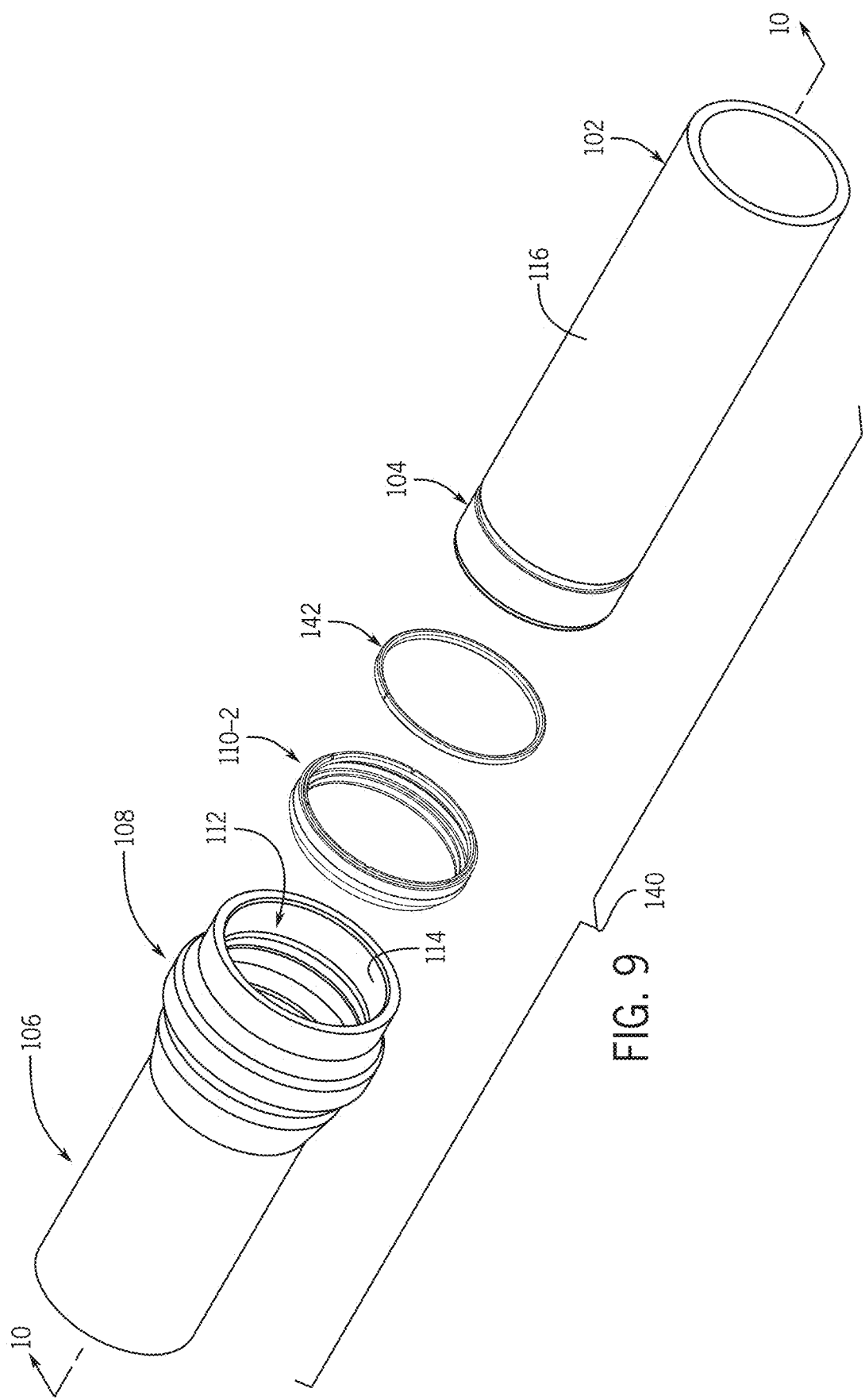
FIG. 9 shows an exploded view of another example of a pipe joint assembly including an insert device constructed in accordance with the teachings of the present disclosure.
Figure 10:
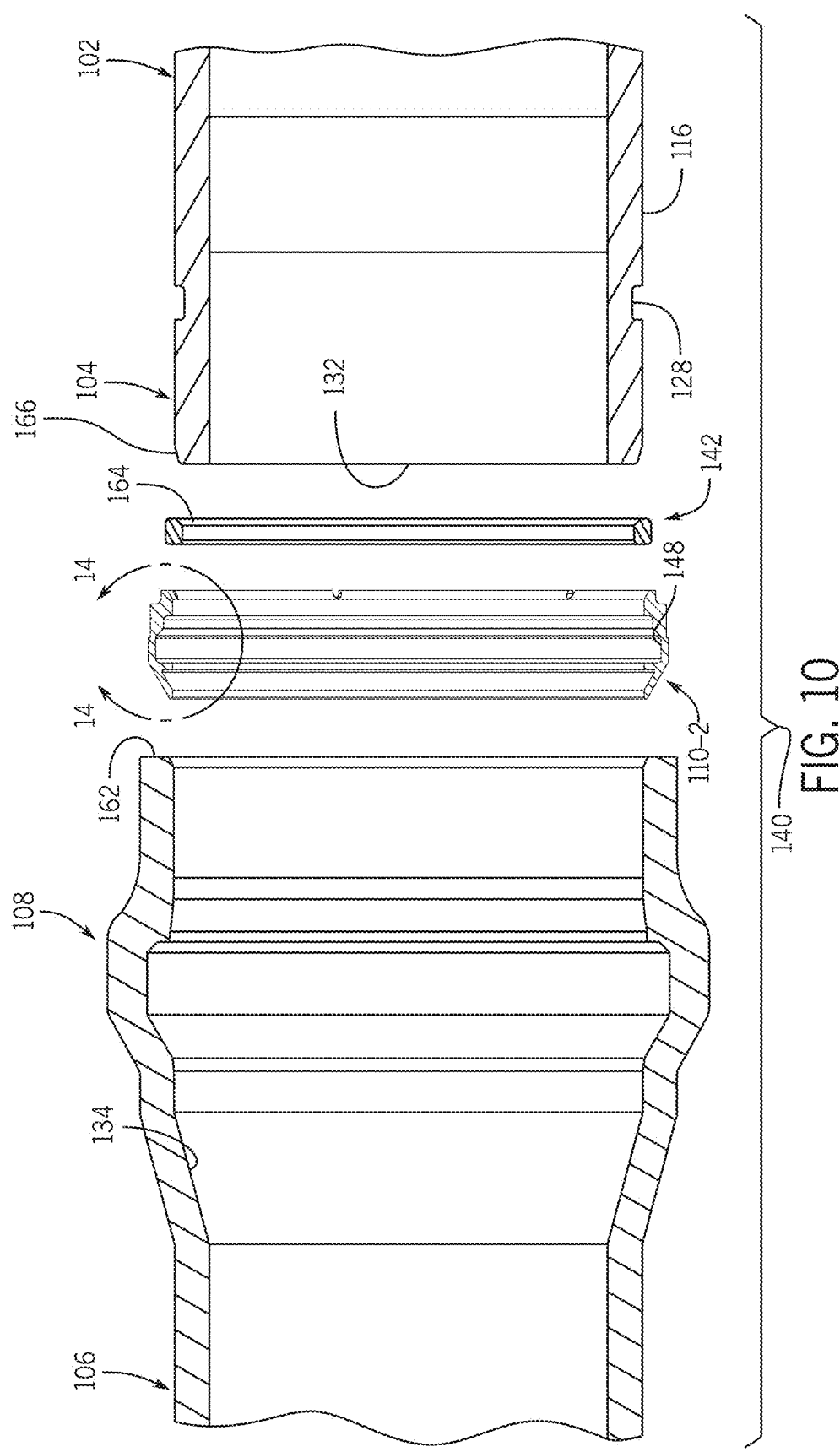
FIG. 10 shows a cross-section view taken along line 10-10 of the pipe joint assembly of FIG. 9.
Figure 12:
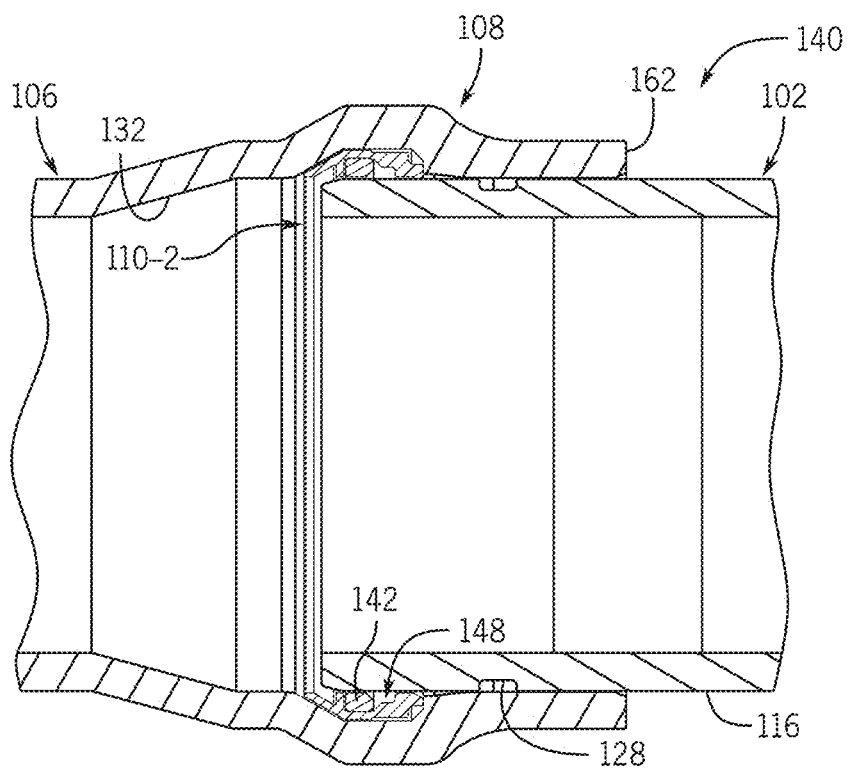
Figure 13:
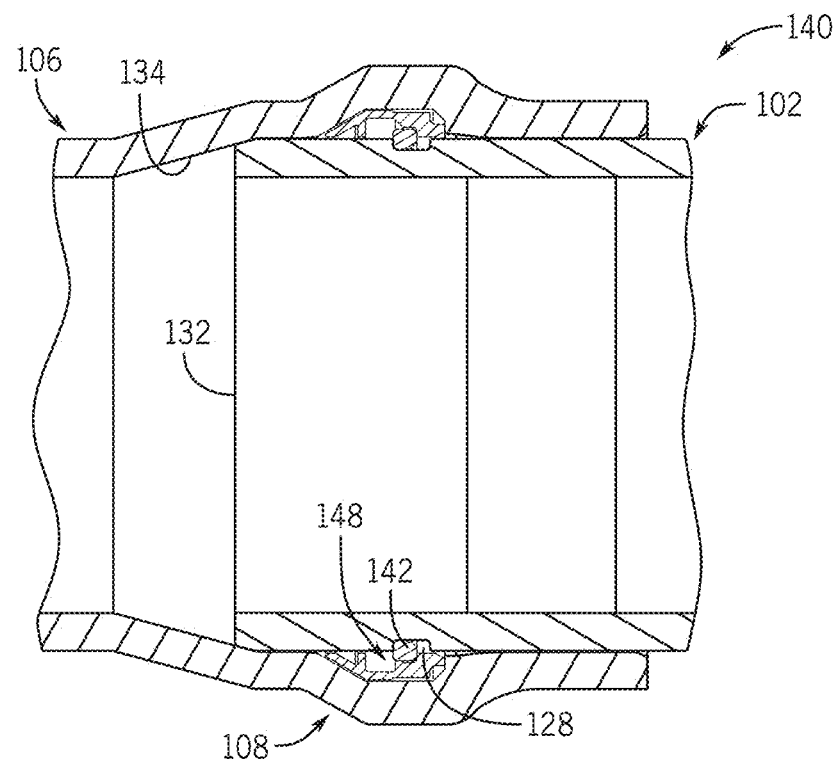
Figure 14:
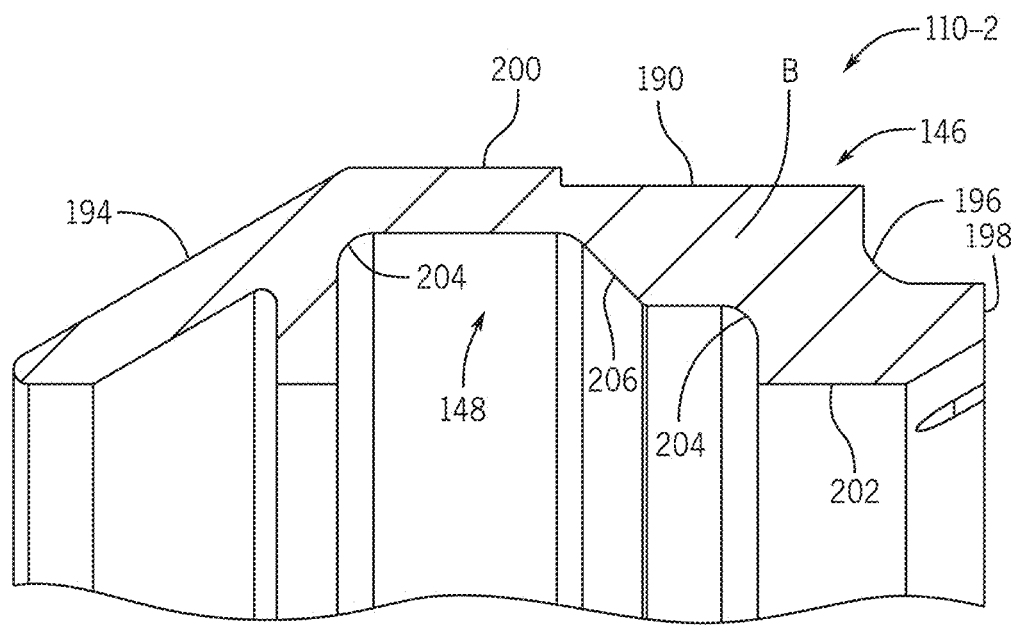
FIG. 14 shows a close up cross-section view of a portion taken from line 14-14 of the insert device of FIG. 10 depicting one example of an insert device constructed in accordance with the teachings of the present disclosure.

FIGS. 9-13 show another example of a pipe joint assembly 140 that utilizes a radially expandable, split-ring, Certa-Lok® CLIC™ type spline 142 and an insert device 110-2. FIGS. 9 and 10 show the components of the pipe joint assembly 140 in exploded view, including the insert device 110-2, the split-ring spline 142, the spigot 104 of a first pipe 102, and the belled end 108 of a second pipe 106. In this example, the insert device 110-2 includes a body B having a spline groove portion 146 with a dual-depth spline groove 148, as shown in FIG. 14. The belled end 108 of the second pipe 106 may again be formed using the below-described process with the insert device 110-2 pre-disposed or pre-installed within the belled end. The spigot 104 of the first pipe 102 is again formed having a spline groove 128 in the OD surface 116. In this example, the spline 142 is a radially expandable split ring that seats in the aligned spline grooves 128, 148 and allows assembly of the two pipes 102, 106, as described further below, but does not permit disassembly of the two pipes, i.e., the pipe joint assembly 140.

Figure 15:
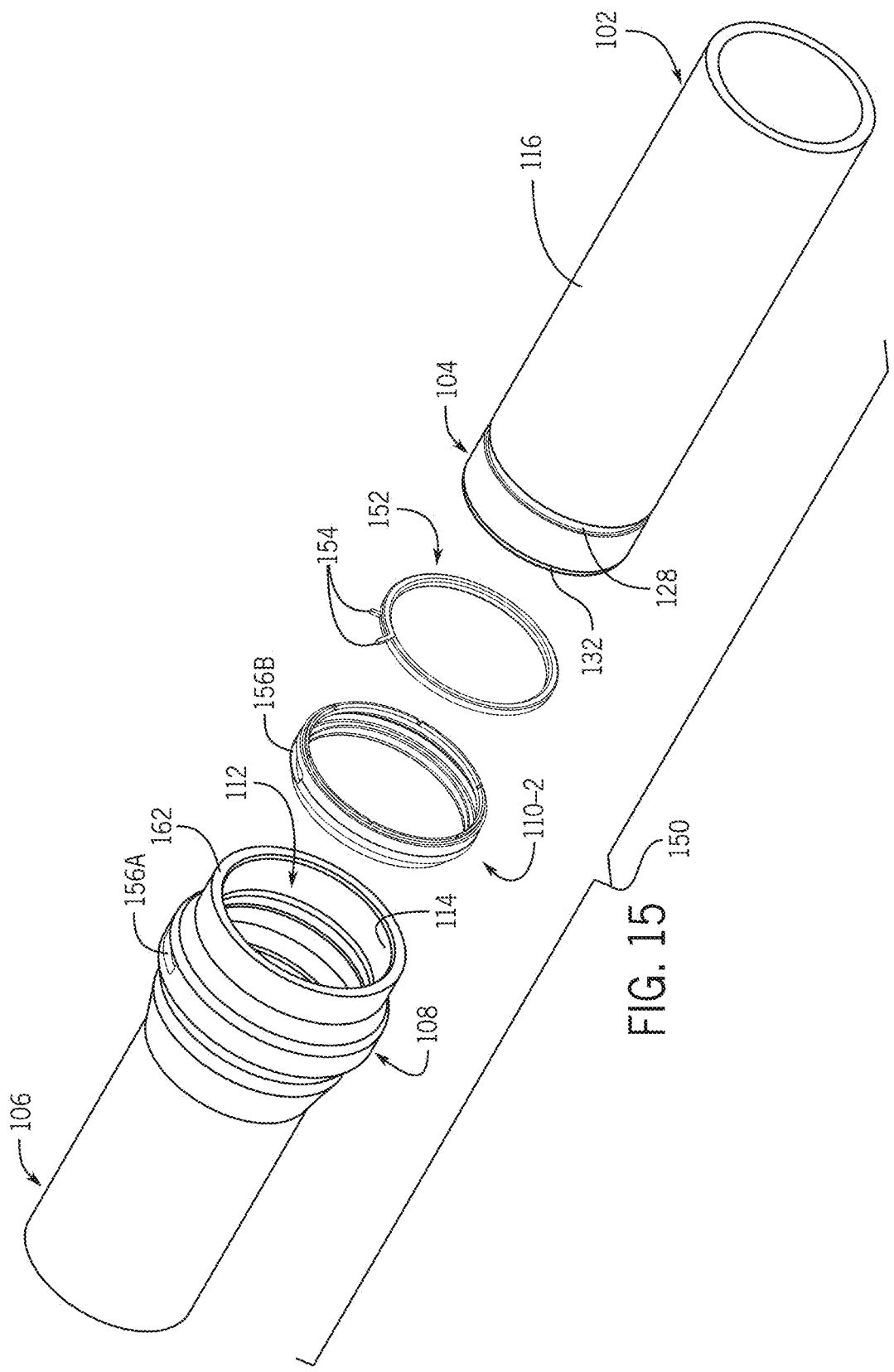
FIG. 15 shows an exploded view of another example of a pipe joint assembly including an insert device constructed in accordance with the teachings of the present disclosure.

FIG. 15 shows another example of a pipe joint assembly 150 that utilizes a radially expandable, split-ring, Certa-Lok® CLIC™ type spline 152 and an insert device 110-2 similar to the device used in the pipe joint assembly 140 of FIG. 14. FIG. 15 again shows the components of the pipe joint assembly 150 in exploded view, including the insert device 110-2, the split-ring spline 152, the spigot 104 of a first pipe 102, and the belled end 108 of a second pipe 106. In this example, the insert device 110-2 again includes the body B having the spline groove portion 146 with the dual-depth spline groove 148. The belled end 108 of the second pipe 106 may again be formed using the below described processes with the insert device pre-disposed or pre-installed within the belled end.

In this example, the spline 152 is again of a split ring type, but also in this example has actuation or release tabs 154 connected to each of the free ends, which circumferentially overlap one another, of the split ring spline. The spigot 104 of the first pipe 102 is again formed having the spline groove 128 in the OD surface 116. In this example, the spline 152 is radially expandable by actuating or pinching the release tabs 154 toward one another. The spline 152 seats or is captured in the aligned spline grooves 128, 148 and allows assembly of the two pipes, as described further below, and also allows for disassembly. The belled end 108 of the second pipe 106 and the insert device 110-2 in this example include tab openings 156a, 156b, which expose the release tabs 154 of the split ring spline 152 to the exterior of the pipe joint assembly 150 (not shown).

For the pipe joint assemblies 140 and 150 in either example of FIGS. 9-13 or FIG. 15, the spline groove 148 in the insert device 110-2, as shown in FIG. 14, has a first groove section 158 having a shallower radial depth and a second groove section 160 having a deeper radial depth. The first groove section 158 is disposed axially closer to a distal end 162 of the second pipe 106 and the second groove section 160 is disposed axially further from the distal end of the second pipe. In each of these embodiments, the splines 142 and 152 are pre-installed within the spline groove 148 of the insert device 110-2. The splines 142 and 152 in a relaxed state each have a diameter that keeps the splines captured within the spline groove 148 of the insert device 110-2 and sized to correspond to the shallower radial depth of the first groove section 158. Each of the splines 142 and 152 may have a chamfer 164 or angled corner surface on the radial inner side of the spline and on the axial side that faces toward the distal end 162, and thus the incoming spigot 104. Likewise, the distal end 132 of the spigot may also have a chamfer 166 or angled surface on the radial outer edge of the distal end surface.

Figure 11:
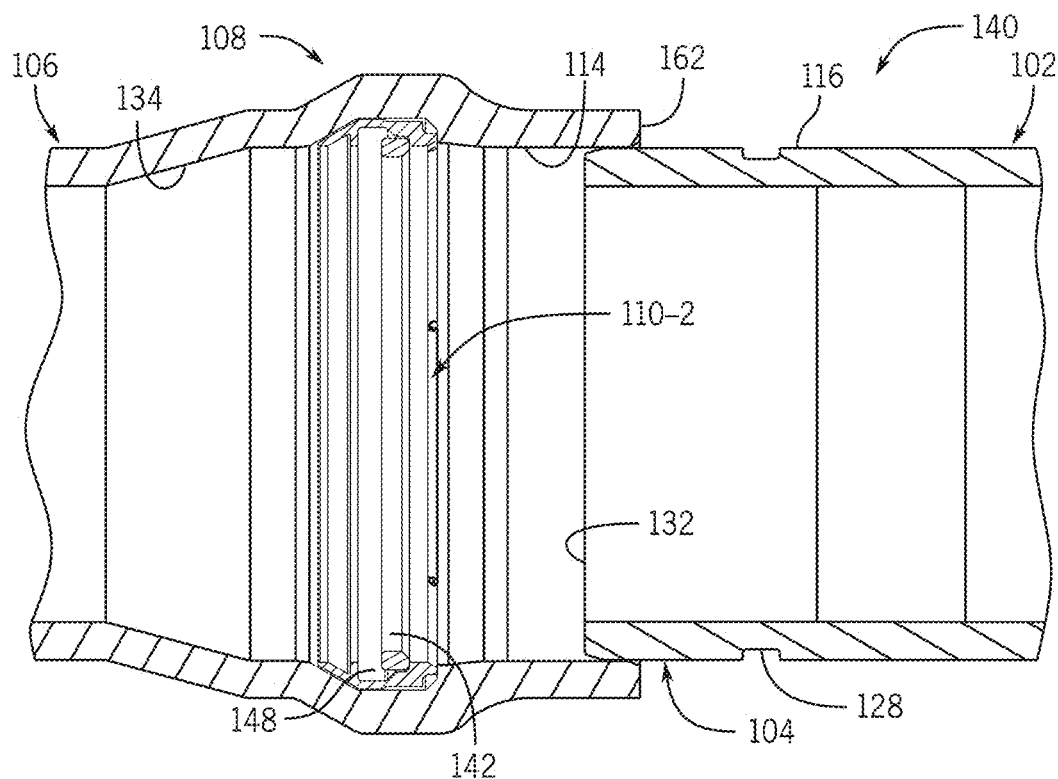
FIGS. 11-13 show views of the pipe joint assembly of FIG. 10 in progressive stages of being assembled.

To form the pipe joint assemblies 140 and 150, the spigot 104 of the first pipe 102 is inserted into the belled end 108 of the second pipe 106 and pushed inward, as shown in FIG. 11. The distal end 132 of the spigot 104, such as the chamfer 166 will contact the chamfer 164 on the spline 142 or 152 and force the spline to move axially to align with the second deeper groove section 160 of the spline groove 148. The spigot 104 will also force the spline 142 or 152 to radially expand upon contact with the OD surface 116 of the first pipe 102, as shown in FIG. 12. Once aligned with the spline groove 128 in the OD surface 116 of the spigot 104, the spline 142 or 152 will be permitted to radially retract into the spline groove of the spigot, as shown in FIG. 13. Once retracted, the spline 142 or 152 is captured within the two spline grooves 128, 148. The spline 142 or 152 and spline grooves 128, 148 prevent the two pipes 102, 106 from being pushed further together. The shallower depth first groove section 158 of the spline groove 148 in the insert device 110-2 prevents the spline 142 or 152 from radially expanding when the two pipes 102, 106 are pulled apart, as shown in FIG. 13, thus preventing the two pipes from being pulled apart. However, in the example of FIG. 15, a user can manually close the release tabs 154 on the spline 152 to expand the spline into the depth of the deeper groove section 160 of the spline groove 148 in the insert device 110-2. This allows the spline 152 to clear the spline groove 128 in the OD surface 116 of the first pipe 102, which allows the two pipes to be pulled apart with reverse reference to FIGS. 11-13.

Thus, in some examples, the spline 120 is an elongate plastic strip, i.e., an extruded spline that is inserted into a space formed by corresponding grooves in the overlapping ends of the two pipes. In some examples, the extruded spline is inserted through a hole in the female end of the second pipe into the space and is captured within the corresponding grooves. The spline interlocks the two pipes together by preventing the two pipe sections from moving axially relative to one another. The spline can be withdrawn from the space within the aligned grooves via the hole to unlock the joint assembly and permit separation of the two pipes.

In other examples, the spline 142 or 152 is a split plastic ring that is circumferentially expandable and contractable but is pre-installed before the pipes are assembled. This type of spline may include tabs 154 accessible from the exterior of the pipes to manipulate and expand the spline. The spline is received in a space formed by corresponding grooves in the overlapping ends of the two pipes. One of the grooves, in this case the groove 148 in the insert device 110-2 within the female or belled end 108 of the second pipe 106, has a shallow locking section 158 and a deeper release section 160. The spline 142 or 152 will be seated in the shallow section 158 of the spline groove 148 and will thus seat in the other spline groove 128 of the first pipe 102 as well, when the pipe joint assembly is pulled apart in a separation direction. In the shallow section 158, the spline 142 or 152 cannot be expanded radially and lies in part in each of the two spline grooves 128, 148, which axially interlocks the two pipes together. If the two pipes 102, 104 are pushed together, the spline will align with the deeper section 160 of the spline groove 148 of the insert device 110-2 in the second pipe. This permits the spline 152 to expanded via the release tabs 154 into the deeper section, which withdraws the spline from the spline groove 128 in the first pipe 104. If the spline is maintained in this position, the two pipes can be pulled apart and separated. These spline locking arrangements are known in the art. The type shown in FIGS. 9-13 and as described above is produced as the Certa-Lok® CLIC™ PVC pipe interlocking system produced by North American Pipe Corporation, the assignee of the present disclosure. The other types are also produced and sold by the assignee of the present disclosure.

According to the above described pipe joint assembly examples, the insert device configuration and construction can vary. Details of the insert devices can vary within the spirit and scope of the present disclosure, as will become evident upon reading the written description and reviewing the several examples disclosed and described herein. In the example of FIG. 8, described only briefly above, as well as other examples shown and described herein, the insert device 110-1 includes a relatively stiff or rigid, annular, circular, or ring-shaped base or body B (i.e., the annular body). In this example, the spline groove portion 126 has a generally flat outer or OD surface 170. The annular body B of the insert device 110-1 of FIG. 8 has a tapered face 174, i.e., a leading end or edge, on the end of the annular body B opposite the spline groove portion 126. The body B also has an opposite tapered face 176 at the other end of the body. The annular body B of the insert device 110-1 may be said to have a "one-hump" or "single hump" configuration, based on the generally flat nature of the outer or OD surface 170.

In this example, the spline groove 118 is formed into an ID surface 180 of the spline groove portion 126 and has a generally rectangular cross-section, but with rounded corners 178 at the depth of the groove. The annular body B also has a void 182 on the inner side of the tapered face 174 and axially adjacent the spline groove 118. The void 182 can help reduce material usage for the annular body B and reduce surface contact and thus sliding friction, if any, as the first pipe 102 is inserted into the second pipe 106 during assembly of the pipe joint. The disclosed insert device 110-1 of FIG. 8 provides the spline groove function as described above. This limits the need to cut a spline groove on the inside surface 114 of the belled end of the pipe 106, which can be difficult and costly. The insert device 110-1 of FIG. 8 can be used in a pipe joint assembly 100 that does not require a fluid tight seal. Alternatively, the pipe joint may be provided with a separate, independent seal. In one example, the seal may be a traditional Rieber type seal or an O-ring type seal installed in the pipe joint, such as in a separate groove on one of the two pipes.

The insert device 110-2 of FIG. 14 is generally similar to the insert device 110-1 of FIG. 8, but with some differences. In this example, the insert device 110-2 also includes a relatively stiff or rigid, annular, circular, or ring-shaped base or body B (i.e., the annular body). In this example, the spline groove portion 146 also has a generally flat outer or OD surface 190 and a tapered face 194 on the end of the body B opposite the spline groove portion 146, i.e., a pipe insertion end or leading, of the annular body. The annular body B also has an opposite face with a scallop 196 or recess between the outer surface 190 and a flat, radially extending face 198 at the other end of the body. The annular body B of the insert device 110-2 may again be said to have a "one-hump" or "single hump" configuration, based on the generally flat nature of the outer or OD surface 190. However, in this example, the outer surface 190 has a higher plateau 200 that protrudes further radially outward than the rest of the surface.

In this example, the spline groove 148 is formed into an inner or ID surface 202 of the spline groove portion 146. In this example, the spline groove 148 includes the shallower first groove section 158 and the deeper second groove section 160. Each groove section 158, 160 has a rounded corner 204 at opposite ends of the spline groove 148 at the depth of the respective section. A tapered or angled transition surface 206 extends between the two grove sections 158, 160. The annular body B in this example also has a similar void 210 on the inner side of the tapered face 194 and axially adjacent the spline groove 148.

With respect to the insert devices disclosed herein, in one example, the annular body B may be formed from a polymer. In some examples, the polymer may be at least one of polypropylene (PP), high density polyethylene (HDPE), Acetal, Delrin, Nylon, flexible polyvinyl chloride (PVC), or the like. In other examples, the polymer may include at least one reinforcing material or fiber, such as glass, carbon, fibers, talc, a structural filler, or the like. In one example, the annular body B can have a modulus of elasticity in a range of about 1E9 N/m² to about 4E9 N/m². The annular body B may include an axis, an ID, and an OD. The annular body B may also have an axial length depicted in each of FIGS. 2-8.

Also, with respect to the insert devices disclosed herein, in one example, the pipe joint assembly may have one or more separate seals, not shown, installed in the joint between the two pipes 102 and 106 as is known in the art. Such a seal or seals may be formed of a seal material such as an elastomer. The seal or seals may also be formed having a circular, annular, or ring shape to form a fluid tight seal within the pipe joint assembly. In some examples, the seal material, such as the elastomer, of the seal or seals may be formed of at least one of an isoprene rubber (IR), a styrene butadiene rubber (SBR), an IR/SBR blend, a nitrile, an ethylene propylene diene monomer (EPDM) rubber, Viton, or the like. In some applications, the seal or seals may be made from an elastomer that may satisfy the chemical compatibility requirements of ASTM standard F477 for elastomer seals for plastic pipe joints. In an example, the seal or seals may be less rigid than the material of the annular body B and may have a hardness in a range of about 40 Shore A to about 80 Shore A.

The insert devices as disclosed herein, including the annular body B, are not intended to be limited to any specific materials or material types. The material of both the annular body B and any separate seals may vary within the scope of the present disclosure and may vary from the limited examples mentioned herein.

In some examples, the insert device may be sized for a wide range of pipe diameters. This range may be between about 3 inches OD to about 48 inches OD, though other sizes are certainly possible. Further, the axial length of the insert device can also vary within a wide range of sizes. In one example, the insert device may have an axial length of about of about 0.125 inches to about 3 inches.

FIGS. 16-30 show examples of different or modified insert devices in comparison to the insert devices 110-1 and 110-2 as described above. These examples are provided to show some of the many design modifications and changes one can make to the insert device within the spirit and scope of the disclosure. Such modifications are not intended to be limited to only those disclosed herein but are instead meant only to illustrate that a wide range of modifications are possible. In the following examples, only the notable differences between these examples and the earlier described examples are described.

Figure 16:
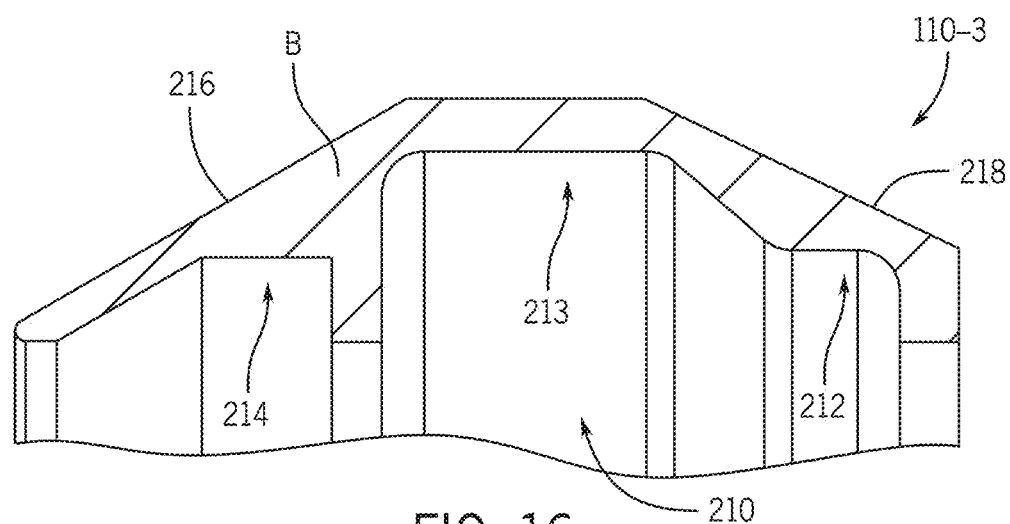
FIGS. 16-30 each show close-up cross-section views of additional examples of portions of insert devices constructed in accordance with the teachings of the present disclosure.

FIG. 16 shows an insert device 110-3 that is substantially similar to the insert device 110-1, but for the spline groove of the annular body B. In this example, the insert device 110-3 has a spline groove 210 with a first shallower groove section 212 and a second deeper groove section 213, similar to the spline groove 148 and sections 158, 160 on the insert device 110-2. Also, in this example, a void 214 provided axially between a tapered face 216 and the spline groove 210 is axially shorter but radially deeper than the void 182 of the device 110-1. Further, the wall thickness at an opposite tapered surface 218 is substantially thicker, due mostly to the different spline groove shape. The insert device in this example is again a seal-less insert device. The annular body B has a low profile single hump, a tapered pipe insertion end, and a blunt opposite end.

Figure 17:
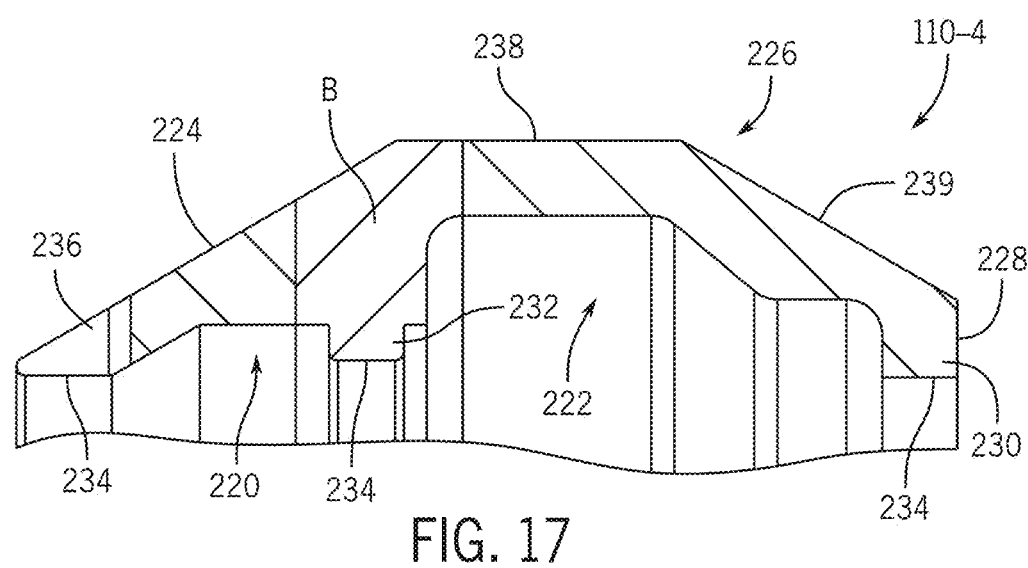

FIG. 17 shows an insert device 110-4 that is similar to the insert device 110-3 of FIG. 16. In this example, the body B has a smaller void 220 created by a thicker wall between a spline groove 222 and a tapered face 224 on a leading edge or end opposite a spline groove portion 226 of the body. An axial face 228 is provided on a trailing edge wall 230 that is also relatively thick. An annular rib or protrusion 232 extends around the inner or ID surface of the annular body B between the void 220 and the spline groove 222. Contact points or surfaces 234 are defined on the radially inner surfaces of the trailing edge wall 230, the rib 232, and the leading edge of the tapered face 224. These contact surfaces 234 in this example each are provided on a substantially thicker portion of the body. Further, slots 236 are provided on the leading edge of the tapered face 224, which can provide stress relief for the insert device, such as when it is being installed in the belled end 108 of a pipe 106. Also, an outer or OD surface 238 of the body B is flat between the tapered face 224 and an opposite tapered surface 239.

Figure 18:
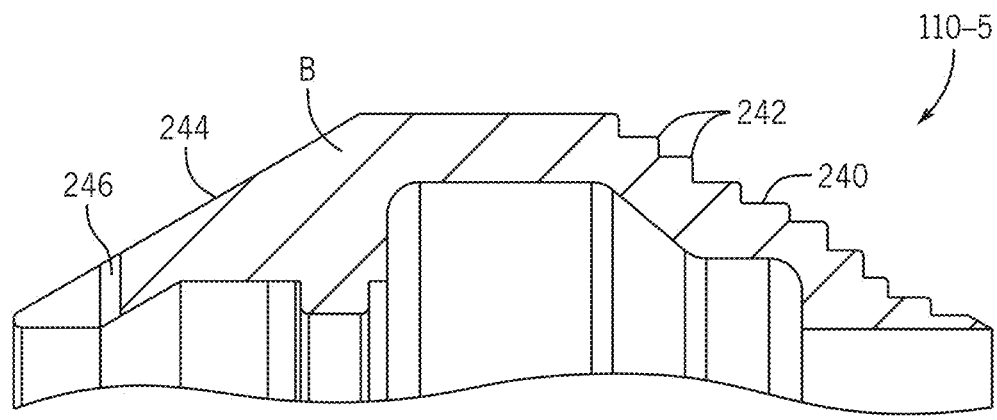

FIG. 18 shows another example of an insert device 110-5 that is substantially similar to the insert device 110-4 of FIG. 17. In this example, an opposite tapered surface 240 includes annular ribs or protrusions 242 extending around the annular body B and over the opposite tapered surface. The ribs 242 are not on a tapered face 244, which would otherwise hinder installation of the insert device 110-5 within the second pipe 106 during formation of the belled end 108, as illustrated further below. These plastic ribs 242 may penetrate the material of the ID surface 114 of the second pipe 106 into which the insert device 110-5 is installed during assembly because the material will be hot enough to allow penetration. Such ribs 220 can thus form an axial mechanical link, i.e., by creating bite via a radial overlap between the material of the annular body B and the material of the pipe 106 into which it is installed. The annular body B also has holes 246 formed through the tapered face and around the circumference of the insert device 110-5. These holes 246 can allow a vacuum or negative pressure to be applied to the ID surface 114 of the belled end 108 of a pipe when the belled end is formed to further assist in forming the recesses or grooves 112 within the pipe to retain and conform to the shape of the insert device, as described in further detail below.

Figure 19:
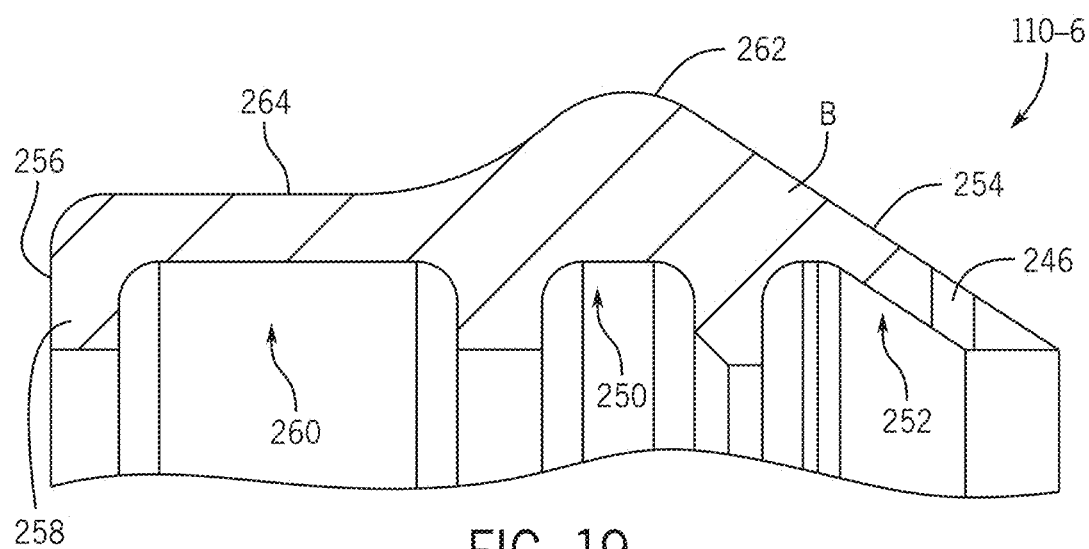

FIG. 19 show an insert device 110-6 with an annular body having a spline groove 250 near the axial middle of the body. A void 252 is disposed between the spline groove 250 and a tapered face 254 on the leading end or edge. An axial face 256 is defined by a trailing edge wall 258 on the end of the body opposite the tapered face 254. An annular channel 260 is formed in the inner or ID surface and is axially longer than the spline groove 250. An outer or OD surface has a rounded hump portion 262 adjacent the tapered face 254 and a flat portion 264 between the hump portion 260 and the axial face 256. The void 252 and channel 260 can be provided for manufacturing purposes, to reduce the amount of material needed for the insert device, to limit contact surface area and thus friction between the annular body and the first pipe being inserted into the belled end of the second pipe. Alternatively, a separate seal (not shown) may be mounted therein to create a seal in the pipe joint assembly.

Figure 20:
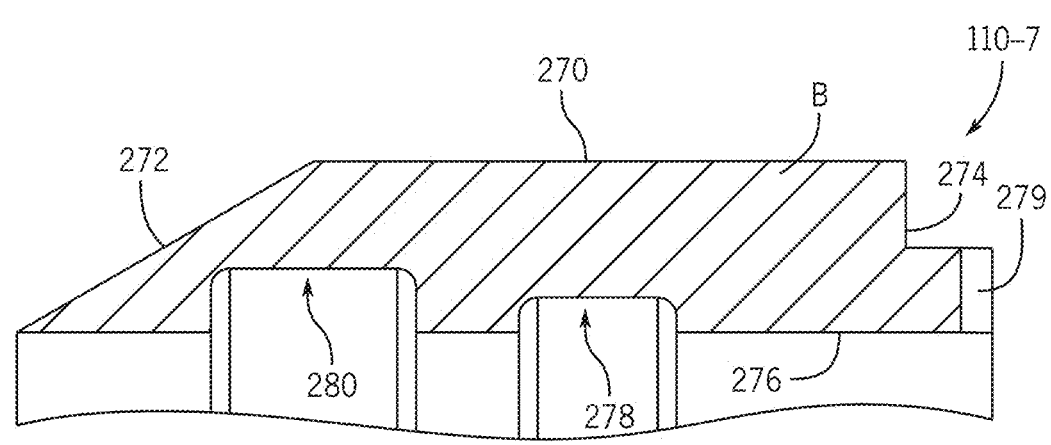

FIG. 20 shows another example of an insert device 110-7 with an annular body B with sharp contours. The annular body has an outside or OD surface 270 that is primarily flat and relatively lengthy in an axial direction. A tapered face 272 is provided at a leading end or edge of the insert device 110-7. A rectangular scallop 274 is provided around the circumference of the annular body on the trailing edge or end opposite the tapered face 272 on the body. Vacuum holes 276 are provided that extend radially through the body within the scallop 274. The inside or ID surface 276 includes a spline groove 278 and an annular channel 280 around the annular body B.

Figure 21:
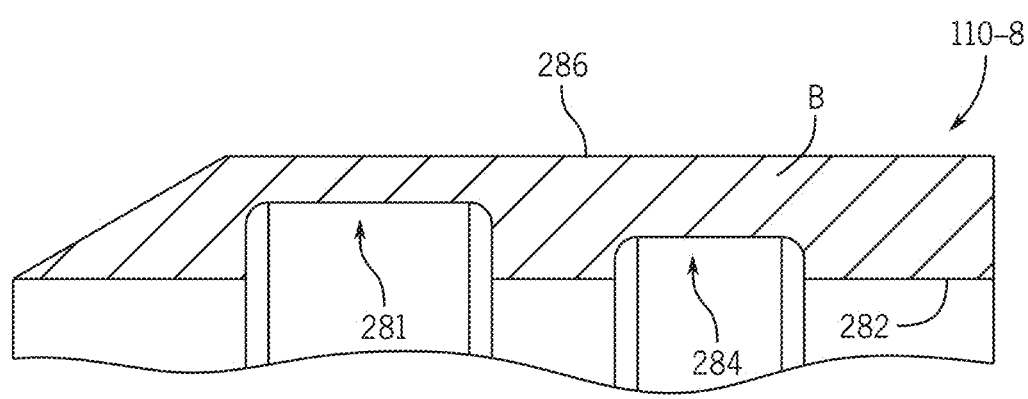
Figure 22:
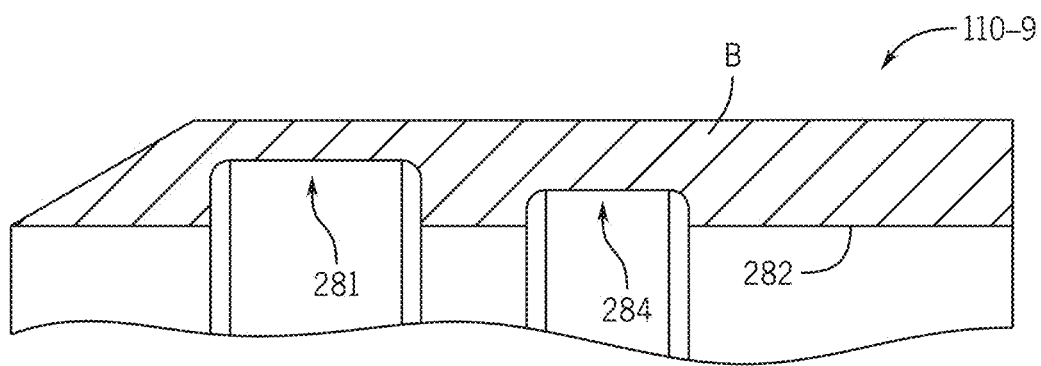

FIG. 21 shows another example of an insert device 110-8 that is similar to the insert device 110-7 of FIG. 20. In this example, the depth of an annular channel 281 into an ID surface 282 is greater than in the insert device 110-7. The axial length of a spline groove 284 is greater in this example than the spline groove 278 of the prior example. Further, the radial wall thickness between an OD surface 286 of the body and the depths of the spline groove 284 and channel 281 is smaller in this example than in the insert device 110-7 of FIG. 20. Also, the insert device 110-8 does not have a scallop around the circumference of the trailing edge. FIG. 22 shows another insert device 110-9 that is substantially similar in construction to the insert devices 110-7 and 110-8, other than minor dimensional differences in portions of the annular body B.

Figure 23:
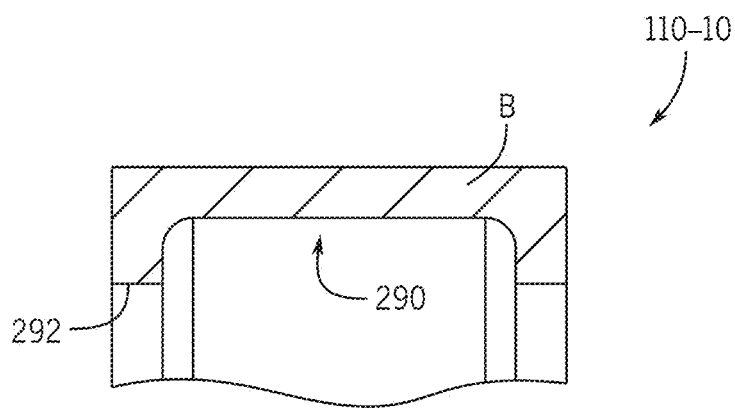
Figure 24:
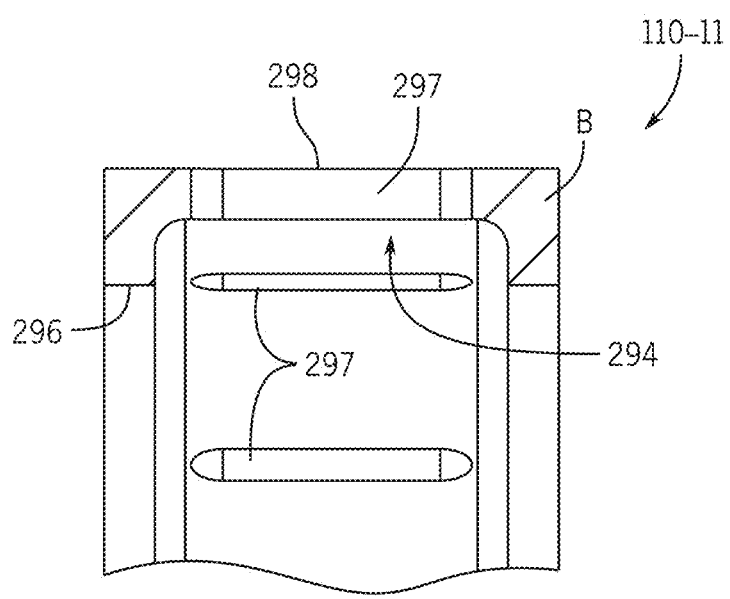
Figure 25:
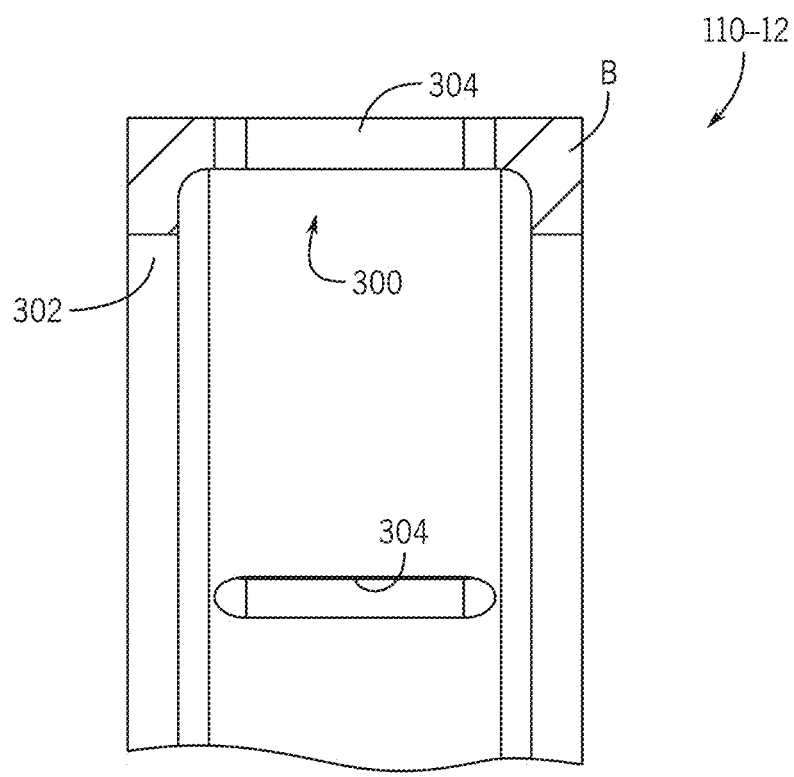

FIG. 23 shows an insert device 110-10 that has a simple shape in the form of a rectangular shaped annular body. A spline groove 290 is formed in the annular inner or ID surface 292. FIG. 24 shows a similar insert device 110-11 with a spline groove 294 in the ID surface 296. Further, axially extending slots 297 are formed through the body from an OD surface 298 into the spline groove 294. These slots 297 can reduce the amount of material usage for the insert device 110-11 and can provide vacuum communication through the insert device for the manufacturing process, as discussed below. FIG. 25 shows another similar insert device 110-12 with a spline groove 300 in an ID surface 302 of the annular body B. In this example, slots 304 are provide through the body into the slots that are spaced further apart circumferentially than in the example of FIG. 24. The spline grooves 290, 294, and 300 in the insert devices 110-10, 110-11, and 110-12 are of the single depth type.

Figure 26:
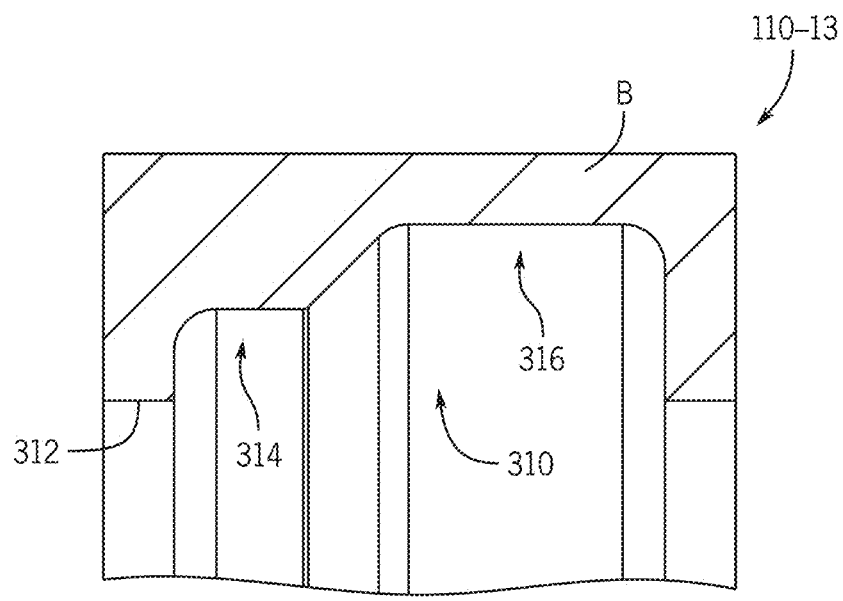

Referring to FIG. 26, an insert device 110-13 is shown that is substantially similar to the insert device 110-10 of FIG. 23 in that is has a rectangular shaped annular body B. However, a spline groove 310 is formed in an ID surface 312 of the annular body B and the spline groove is of the dual depth type with a shallower first groove section 314 and a deeper spline groove section 316.

FIGS. 27-30 show further alternate examples of insert devices. In these examples, each has an annular body B with a spline forming portion and a seal portion. Each seal portion carries a seal part S that may be co-molded, dual molded, or otherwise molded as a part of the annular body, but having the softer material characteristics of a seal, as noted above.

Figure 27:
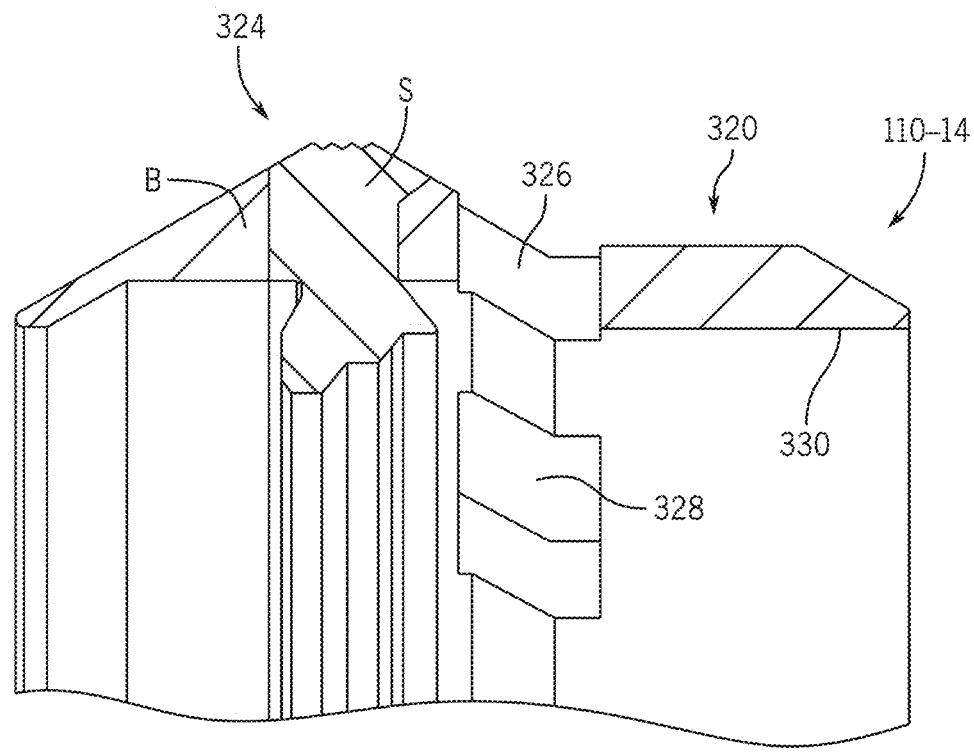
Figure 28:
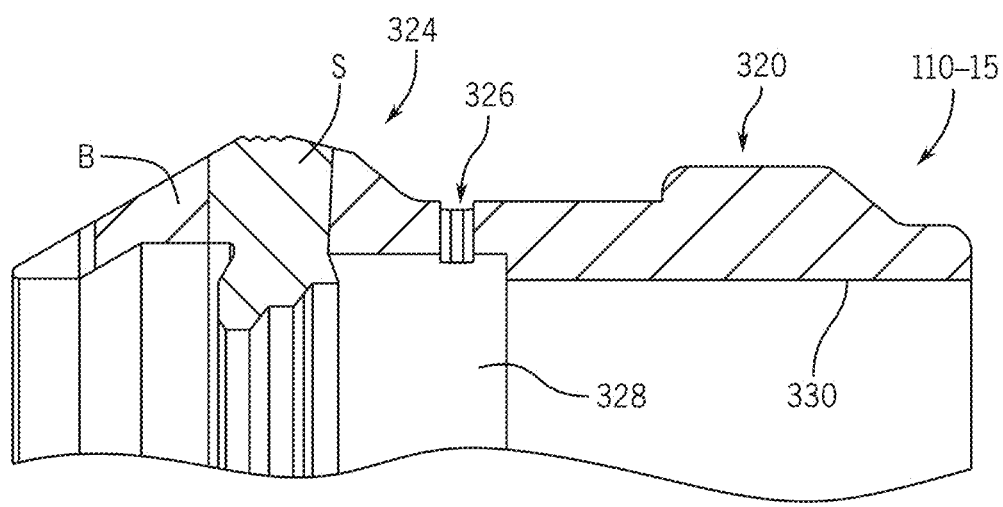
Figure 29:
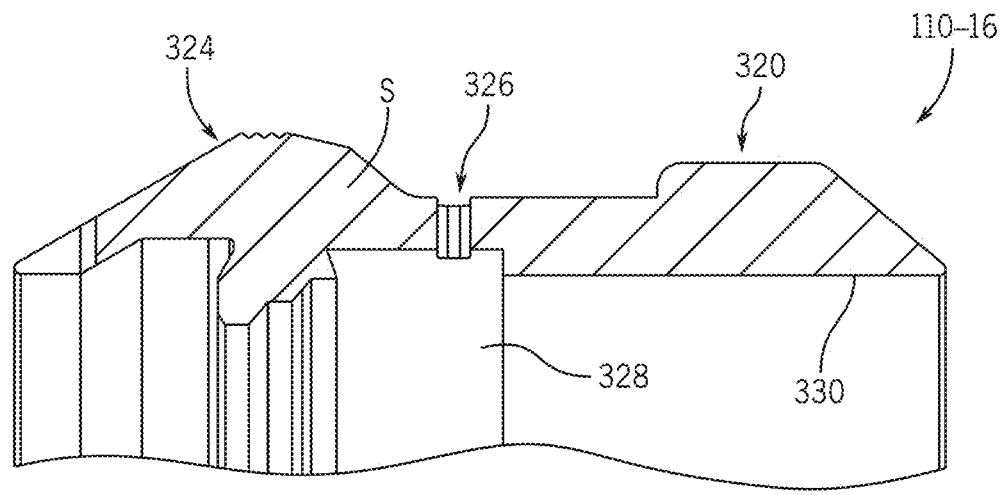
Figure 30:
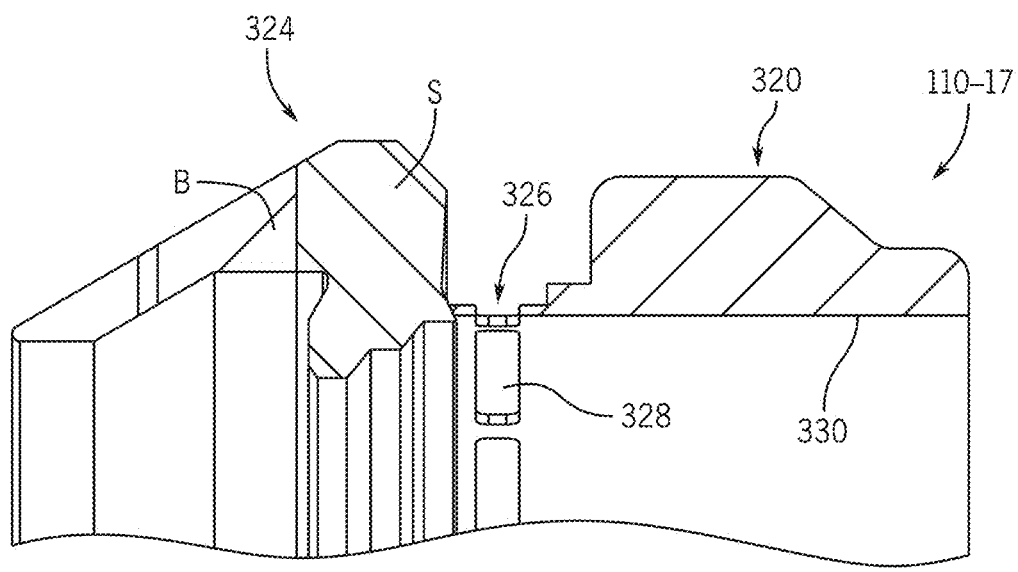

In FIG. 27, an insert device 110-14 has an annular body B with a spline groove forming portion 320 that is used to form a spline groove 322. The insert device 110-14 also has a seal portion 324 of the annular body B and has a seal part S coupled to the seal portion. In this example, the annular body B includes a separate connecting portion 326 with holes 328 formed therethrough around the circumference of the body B. The spline groove forming portion 320 is merely a thick, solid, annular portion of the body B. The spline groove forming portion 320 in this example may be a sacrificial or at least partly sacrificial portion. Though not shown, a spline groove can be cut, machined, or otherwise formed into an ID surface 330 of the spline groove forming portion 320 to create the spline groove in the belled end 108 of a pipe 106, once installed. Alternatively, a spline groove can be cut through the spline groove forming portion and, if desired, into the ID surface 114 of the pipe 106, to form the spline groove. In another example, once the insert device of FIG. 27 is installed, the spline groove forming portion 320 may be completely removed, i.e., entirely sacrificial. Thus, a spline groove can be left behind in the belled end of the pipe via the shaped of the recesses 112 left behind, instead of by cutting the pipe wall and reducing the wall thickness. FIGS. 28-30 show insert devices 110-15, 110-16, and 110-17 where the spline groove forming portion is shaped to leave behind a particular spline groove shape. Alternatively, the spline groove may be otherwise post-formed or partly post-formed in the ID surface of the pipe. In these example, the spline groove forming portion 320 may be used to improve or set the axial positioning of the insert device, to form a spline groove as one of the insert recesses 112, which may or may not then be further processed, i.e., shaped or cleaned up, for some other manufacturing purpose or advantage, or to retain a thicker pipe wall at the spline groove.

In other examples, the annular body may include the annular seal and spline groove portions joined directly to one another and may thus exclude the connecting portion. In still other examples, the connecting portion may be an easily breakable or frangible connection to make removal of the spline groove forming portion relatively easy, such as in FIGS. 29 and 30. The seal part S in the examples of FIGS. 27-30 may provide a seal on the inner side or the outer side, or both, of insert device. Thus, the insert devices therein may create a seal between the first pipe and the insert device and between the second pipe and the insert device.

The shape and configuration of the annular body B and the seal part S of the insert devices may vary from the examples shown and described herein and yet function as intended. The annular seal portion and the spline groove portion can each have their own unique size, shape, and configuration, independent of the other portion. Each portion can also take on any of the disclosed example shapes, regardless of the shape of the other portion. The seal part S, seal or seals, and seal material may also vary in size, shape, and configuration from the examples disclosed and described herein.

Figure 31:
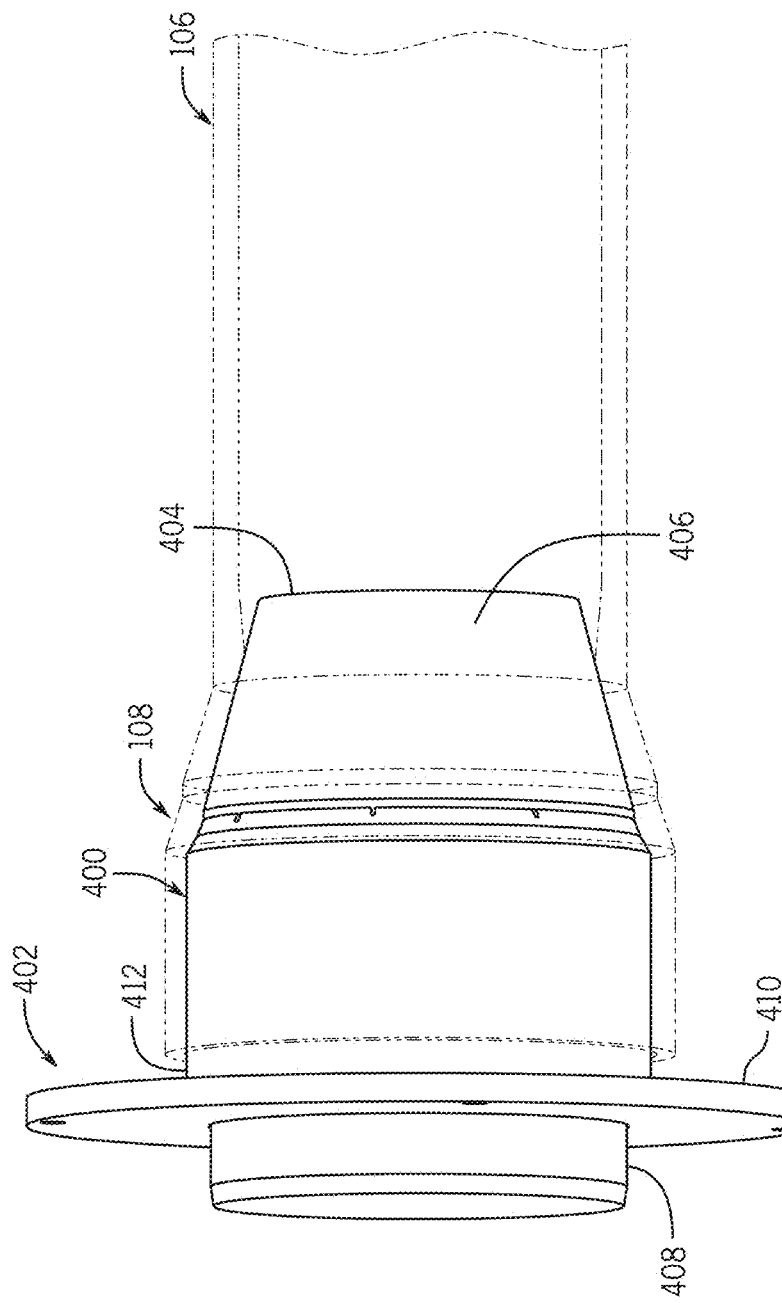
FIG. 31 shows a belling tool assembly and a portion of a pipe in accordance with the teachings of the present disclosure.

The methods used to form a belled end 108 on a second pipe 106, which includes a pre-disposed or pre-installed insert device as disclosed herein, can vary. Referring to FIG. 31, one example of a method utilizes a bell-shaped mandrel 400 and a stripper plate 402. In general, the mandrel 400 is forced into the distal end 162 of a hot or heated second pipe 106. The mandrel 400 is somewhat bullet shaped and may have a smaller diameter nose 404, a tapered, gradually increasing diameter section 406, and a constant larger diameter section 408. The mandrel 400 is configured to gradually increase the ID of the distal end 162 opening and an end portion of the hot pipe material as the mandrel is forced further into the end of the second pipe 106. The end 108 of the pipe takes on the bell-like shape of the mandrel 400. This shaping process can be done while the pipe 106 is hot after being extruded.

Figure 32:
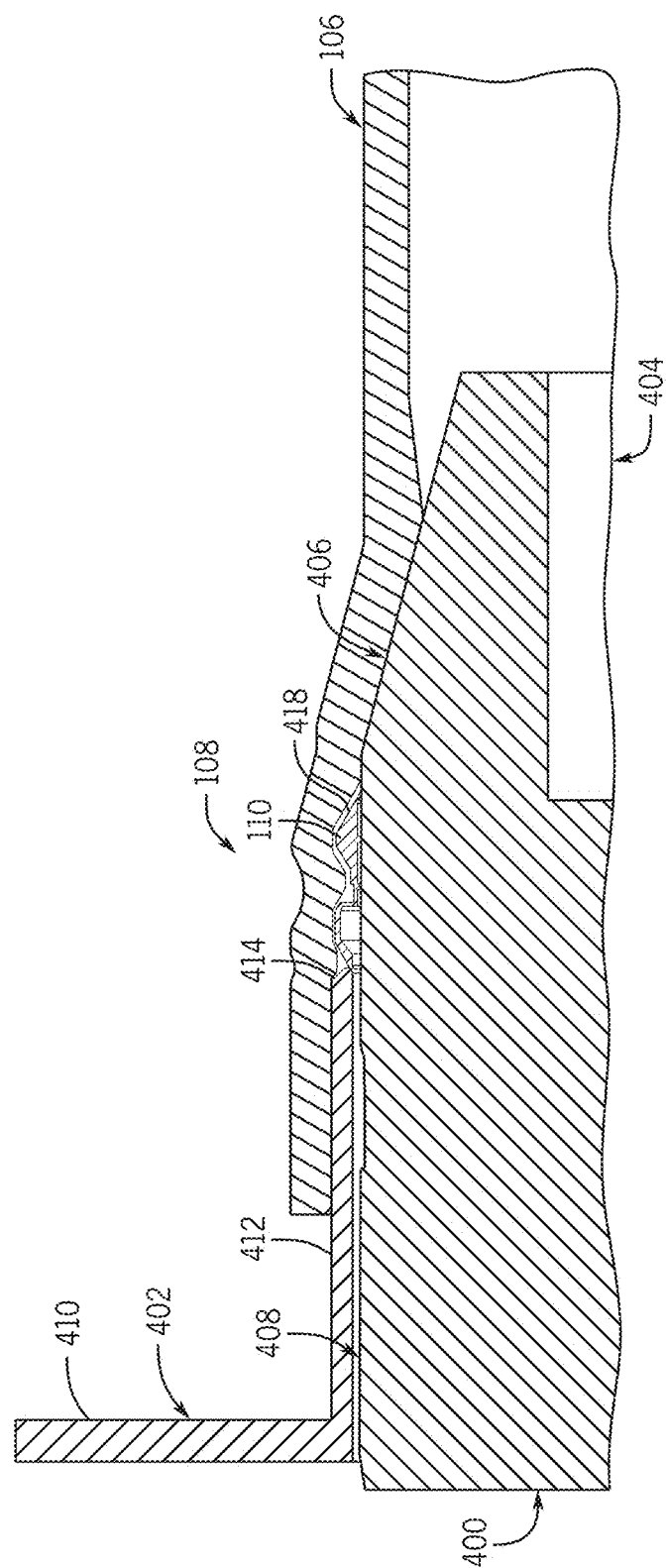
FIG. 32 shows a cross-section view of one example of a portion of a belling tool assembly and a portion of a belled pipe and an insert device constructed in accordance with the teachings of the present disclosure and at a stage during forming of the belled end of the pipe.

In this example, the stripper plate 402 is configured to interact with the mandrel 400 as shown in FIGS. 31 and 32. The stripper plate 400 may have a disc portion 410 oriented perpendicular to the axis of the pipe 106 and the mandrel 400. The stripper plate 402 also has a cylindrical section 412 that is sized to fit over the constant larger diameter section 408 of the mandrel 400. The cylindrical section 412 is also sized or shaped to forcibly fit within the distal end 162 portion of the pipe 106 as shown in FIG. 31, as the mandrel 400 is forced into the distal end 162 of the pipe 106, or vice versa. The free end of the cylinder section 412 has a shallow taper 414 to aid in the distal end 162 of the pipe 106 being forced over the tapered end and the cylindrical section of the stripper plate 402 and the mandrel 400.

As shown in FIGS. 31 and 32, an insert device, generically identified as insert device 110 for describing the process, may be mounted on the mandrel 400 at a desired position along the constant diameter portion 408 of the mandrel. The tapered or free end of the cylindrical section 412 of the stripper plate 402 abuts the tapered face, i.e., a leading edge or end 418 of the insert device 110 as shown in FIG. 32. The stripper plate 402 thus may hold the insert device 110 in the desired position on the mandrel 400 as the mandrel is forced into the end of the pipe 106 or the pipe is forced onto the mandrel. Instead of the distal end 162 of the pipe 106 pushing the insert device 110 along the outer surface 416 of the mandrel 400, the stripper plate 402 holds the insert device in place. The end of the pipe 106, while the material is hot, will thus pass over and onto the insert device 110 and the cylindrical section 412 of the stripper plate 402. The leading edge or end of the insert device 110 may also have a ramped or tapered end or face 418 that gradually expands the distal end 162 of the pipe 106 so that the pipe can pass over the insert device. FIG. 32 shows the pipe end 108 over the mandrel 400, the cylindrical section 412 of the stripper plate 402, and the insert device 110 after the mandrel is forced into the end of the pipe, or vice versa.

When the pipe 106 has taken the desired bell shape 108, the pipe is disposed axially at a specific desired position relative to the mandrel 400 and the insert device 110 is captured between the ID surface 114 of the pipe 106 and the outer surface 416 of the mandrel 400. A vacuum can be applied via the stripper plate 402 and/or through the mandrel 400, and through the various vacuum openings or holes in the annular body B of the insert device 110. The vacuum can aid in pulling or drawing the plastic material of the hot pipe 106 radially inward onto the mandrel 400 and thus the annular body B of the insert device 110. This can help to form the shape of the belled end 108 of the second pipe 106. Alternatively, the belled end 108 may be pressed onto the 400 mandrel as the pipe 106 cools. More specifically, the insert recesses or grooves 286 are formed as the insert device 110 is pressed into the warm pipe 106 material. The pipe 106 is pre-heated, after-hardened, and formed. Then the bell end 108 is heated and pressed onto the mandrel 400. The belled end 108 is then pulled or drawn via vacuum or pressed onto the mandrel and around the insert device 110.

The stripper plate 402 can be withdrawn from or along the mandrel 400 and thus the distal end 162 of the pipe 106. The belled end 108 of the heated pipe is then cooled. The vacuum may be applied or continue to be applied after the stripper plate 402 is withdrawn. Cooling of the pipe material further shrinks the expanded pipe diameter, except that the insert device 110 prevents the pipe from shrinking thereat. The mandrel 400 may also be withdrawn relative to the pipe once the pipe material cools sufficiently. The insert device 110 is captured in insert recesses 286 or grooves that form around the ID surface 114 of the pipe 106 as it shrinks in diameter in order to accommodate the insert device. The insert device 110 is thus pre-disposed, pre-installed, or self-installed within the belled end 108 of the pipe 106. The insert recess 286 formed in the belled end 108 takes the shape of the outer or OD surface of the insert device 110 and retains the position of the insert device within the pipe joint assembly. The bell shape in the second pipe 106 may be formed so that the first pipe 102 is inserted to a precise, predetermined depth in the pipe joint assembly, as described above. The gradual increase in pipe diameter can thus create a stop for the first pipe 102 when inserted in the belled end 108 of the second pipe 106. This depth should insure that the spline grooves of the two pipes axially align with one another and so that the seal within the second pipe is positioned against a flat portion of the OD of the first pipe to create an adequate seal, as described above.

Figure 33:
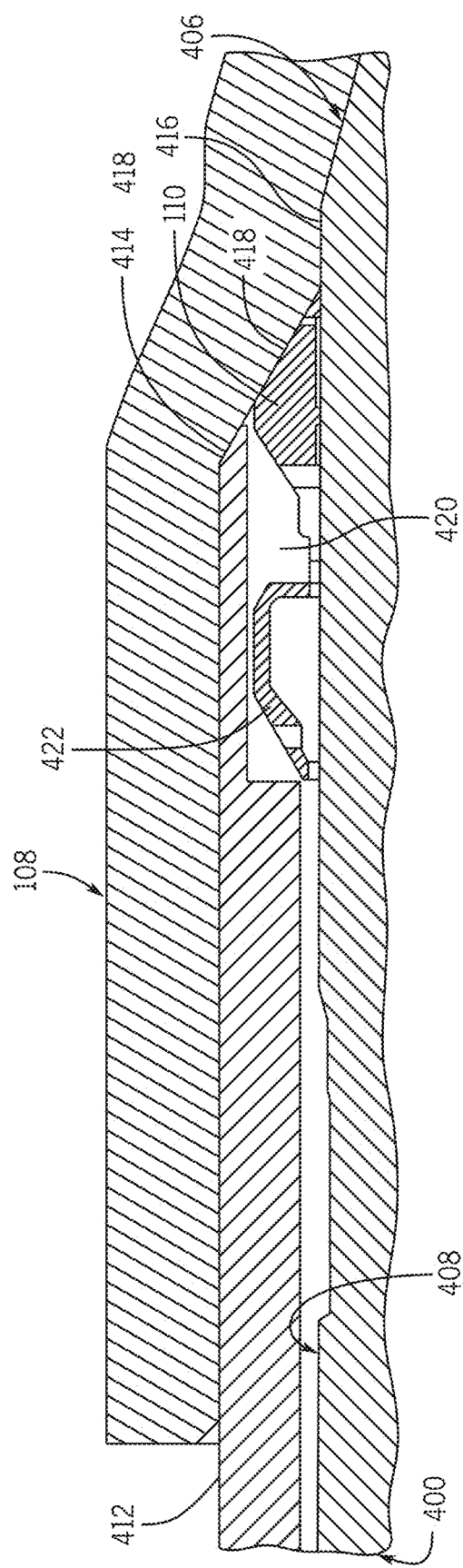
FIG. 33 shows a cross-section view of another example of a portion of a belling tool assembly and a portion of a belled pipe and an insert device constructed in accordance with the teachings of the present disclosure and at a stage during forming of the belled end of the pipe.
Figure 34:
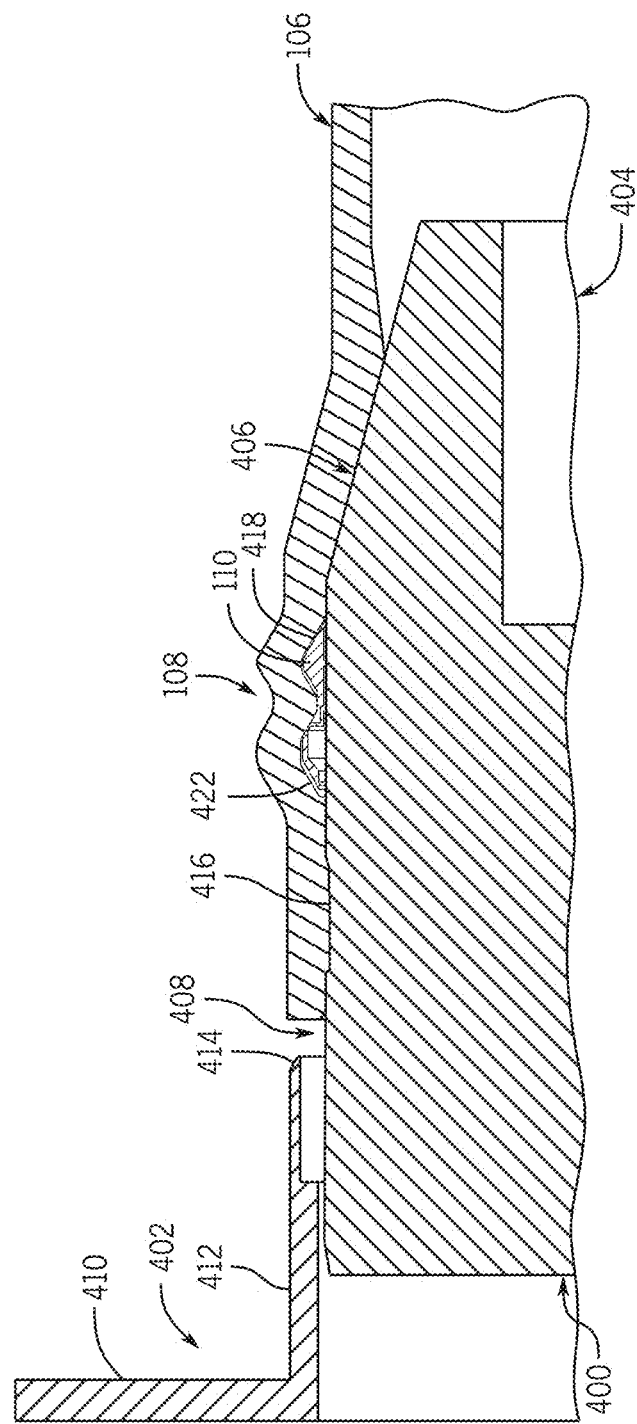
FIG. 34 shows the belling tool assembly at a different stage during forming of the belled of the pipe of FIG. 33.
Figure 35:
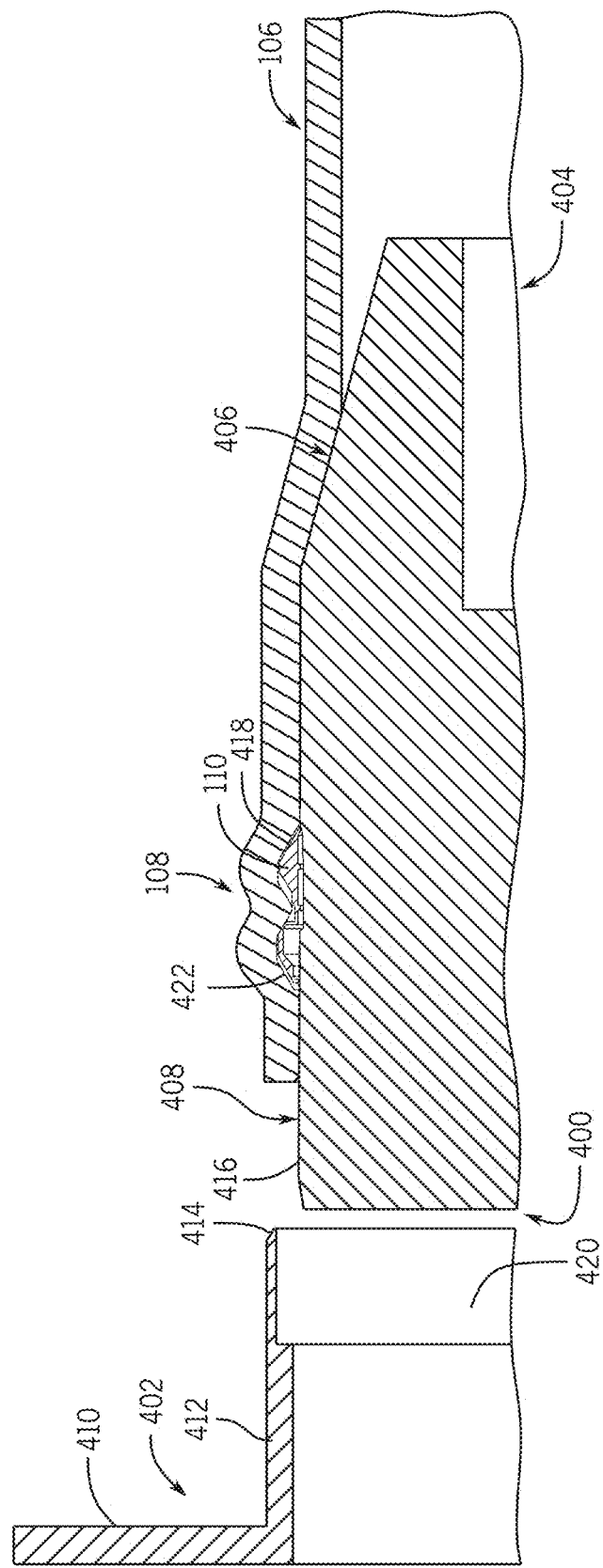
FIG. 35 shows a cross-section view of another example of a portion of a belling tool assembly and a portion of a belled pipe and an insert device constructed in accordance with the teachings of the present disclosure and at the same stage during forming of the belled end of the pipe as shown in FIG. 34.

Various aspects of the method, belling tool assembly, and the pipe joint assembly formed thereby can vary within the scope of the present disclosure. FIGS. 33-35 show examples of only several of the many aspects that may be varied. As shown in FIG. 33, the cylindrical section 412 of the stripper plate 400 may be provided with a pocket 420 that is formed in the ID surface at the free end. The pocket 420 can be sized and configured to extend over and cover the insert device 110 when the stripper plate 402 is in position to receive the distal end 162 of a pipe 106 for belling. The end of the pocket 420 can be positioned to abut the leading edge 418 of the insert device 110 to position and hold it along the mandrel 400 where desired. The pocket 420 may be provided to aid in preventing the insert device 110 from rolling, buckling, or otherwise deforming as the end of the pipe 106 is forced axially along the mandrel 400. The leading edge 418 of the insert device 110 may be exposed, as shown, and may have the ramped or tapered surface to help the end of the pipe 106 to pass over the insert device and the stripper plate 402.

FIG. 33 shows a stage of the forming process of the belled end 108 of a pipe 106 where the pipe is forced over the 400 mandrel, or vice versa, to the desired position to properly place the insert device 110 within the belled end. FIG. 34 shows the bell tooling assembly at a stage where the stripper plate 402 has been withdrawn from the end of the pipe 106 and the pipe is cooling or has cooled. The free end of the pipe 106 shrinks to a size defined by the diameter of the constant larger diameter portion 408 of the mandrel 400. The insert recesses 286 are formed in the ID surface 114 of the belled end 108 and the insert device 110 is captured in the insert recess or recesses 286. The mandrel 400 may then be withdrawn, leaving the insert device 110 in place within the belled end 108 of the pipe 106. The pipe and seal characteristics in FIGS. 33 and 34 are otherwise similar to those of FIGS. 31 and 32. FIG. 35 shows a bell tooling assembly similar to that of FIG. 34, but with the insert device 110 positioned at a different location along the mandrel 400 and thus the end of the pipe 106.

Figure 36:
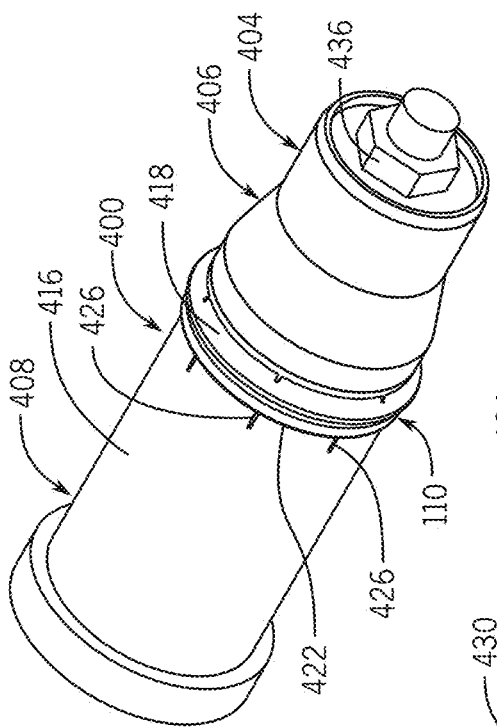
FIG. 36 shows a perspective view of a belling tool assembly in an assembled condition with an insert device installed thereon.
Figure 37:
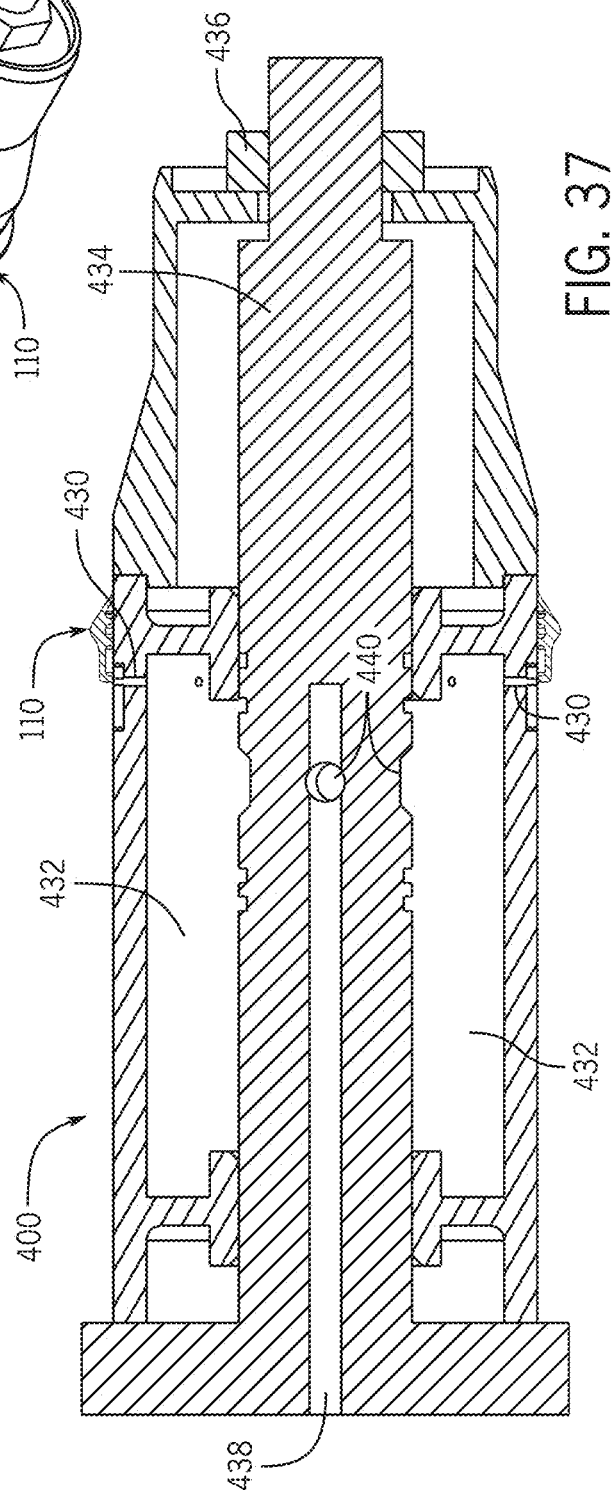
FIGS. 37 and 38 show cross-section views of a vacuum port of the belling tool assembly of FIG. 36.
Figure 38:
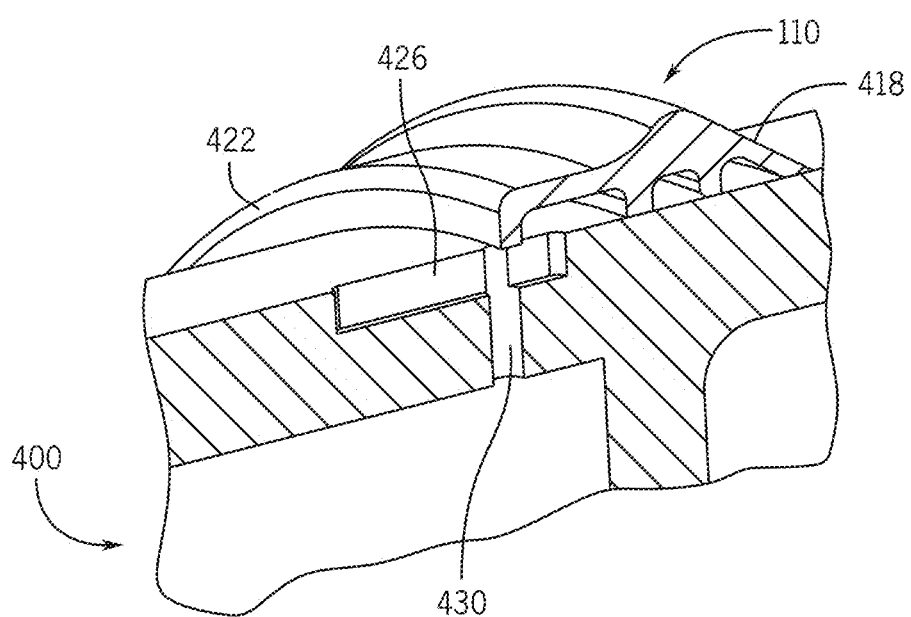

As noted above, aspects of the method, belling tool assembly, and the pipe joint assembly formed thereby can vary within the scope of the present disclosure. FIGS. 36-38 show further examples of aspects that may be varied. As shown in FIGS. 36-38, the belling tool assembly can include a mandrel 400 with vacuum ports or slots 426 around the outer surface 416. The slots 426 are in fluid communication with corresponding air flow passages 430, which are in fluid communication with an air flow chamber or chambers 432. A negative pressure is applied to the chamber or chambers 432, which applies a vacuum to the passages 430 and slots or ports 426 at the outer surface 416 of the mandrel 400.

The vacuum ports or slots 426 in this example have an axial length sufficient to perform a dual purpose. As shown in FIGS. 37 and 38, a portion of each slot 426 aligns with and underlies part of the installed insert device 110, which extends around the mandrel 400. A portion of each slot 426 is exposed to the outer surface of the mandrel. A negative pressure or vacuum is applied to the slots 426 when a heated end of a pipe 106 is forced onto the mandrel 400. The vacuum may aid in holding the insert device 110 in place on the mandrel, as shown in FIGS. 37 and 38. The vacuum will also aid in drawing the material of the end of the pipe that overlies the exposed portions of the slots toward the mandrel. This aids in forming the recesses in the ID surface of the belled end of the pipe around the insert device.

In this example, as shown in FIG. 37, the mandrel 400 can be fitted onto and secured on a cylinder or shaft 434 to fix the mandrel for use. The mandrel 400 can be secured using a nut 436 over a threaded end of the shaft 434. O-rings or seals can be used within the interior of the mandrel 400 to form a seal between the shaft 434 and mandrel body and to create the air chamber 432 in the mandrel 400. A shaft air passage 438 can extend along the cylinder or shaft 434 and one end can be connected to a vacuum source (not shown). The other end or other portions of the shaft passage 438 can be in fluid communication with the air chamber or chambers 432 within the mandrel 400 through one or more bores or holes 440 between the shaft air passage and the air chamber or chambers. The negative pressure can be applied to the mandrel 400 via the shaft air passage 438.

The belling tool assembly can be configured and modified to accommodate belling a pipe end while also installing insert devices of different constructions. The insert devices disclosed herein can be formed using any suitable process or processes. The annular body of the insert device may be machined, cut, molded, or the like and can be made from any suitable material, such as PVC, Nylon, Urethane, or the like. The bell tooling assembly and process can be configured to accommodate such insert devices as disclosed and described herein.

Though not shown herein, the outer circumference of the mandrel may include an annular shallow recess to receive the insert device thereon when installed. The recess may provide accurate axial positioning of the insert device and may also provide some resistance to axial movement of the insert device when the pipe end is forced over the mandrel during formation of the belled end of the pipe. Otherwise, as depicted in FIG. 38, a portion of the annular body, such as the above-described contact surfaces 326 of an insert device 110 can be radially undersized to create an interference (see interference A) between the mandrel 400 outer surface 416 and the insert device to aid in holding its position during formation of the belled end 108 of the pipe 106. Further, the passages and slots or holes can be machined or otherwise formed in the mandrel body.

As illustrated according to the embodiments and examples described above, various aspects of the insert devices can also vary within the scope of the present disclosure. Many examples are described herein. In some examples, the annular body of the insert device may include a substantially consistent wall thickness, in a radial direction, from axial leading edge to axial trailing edge on the body B. In other examples, the wall thickness may vary, in a radial direction, from leading edge to trailing edge on the body B. In some examples, a wall thickness of the belled end 108 of the pipe 106 may be approximately equal to a wall thickness of the non-belled remaining length of the pipe. In other examples, the belled female end 108 of the pipe 106 may have a wall thickness that is greater than or less than a wall thickness of the non-belled remaining length of the pipe. For example, the wall thickness of the female belled end of the pipe may be about 5% to about 20% thicker than the wall thickness of the non-belled remaining length of the pipe.

Examples of the insert device may include a compression ratio of about 10% to about 35%, over a range of pipe-to-pipe angular deflection of about 0 degrees to about 6 degrees. For example, about 0 degrees to about 6 degrees of pipe-to-pipe deflection (i.e., an angle formed between a central axis of a first pipe and a central axis of a second pipe at a pipe joint assembly as measured at opposite pipe ends) may be the defined deflection or pipe flex.

In one example of the method, no cutting or machining of the female belled end is required to form the final pipe joint assembly. In one example, the spline groove does not require machining operations in the belled end of the pipe before or after belling. In another example, the insert device is automatically placed and installed in the belled end during belling of the pipe. In another example, the method may further include coupling the first pipe and the insert device to a second pipe to form a pipe joint assembly by using a mechanical restraint (i.e., a spline, as shown herein) within spline grooves in the second pipe and in the insert device of the first pipe. The pipe joint assembly can thus be a restrained joint type of pipe coupling. In some examples, the final pipe joint assembly may have a tensile strength in a range of about 5,000 lbs. to about 250,000 lbs.

Examples of the insert device may have an aspect ratio (AR) of axial length (AL) to radial height (RH) that can vary. For example, the AR of an insert device can be in a range of about 3.0 to about 5.0. In another example, the AR of an insert device may be in a range of about 6.0 to about 9.0. Examples of the annular body may have an AR in a range of about 5.0 to about 7.0 or as high as a range of about 10.0 to about 15.0. Other examples are certainly possible within the scope of the disclosure.

The shape and configuration of the spline groove in the insert device can also vary depending on the type of spline and joint to be used between two pipes. Many of the above described drawings show a two-depth radius spline groove to be used with the Certa-Lok® CLIC pipe joint configuration of the assignee, which are described in the below-noted pending applications. Other examples an insert device include a different, earlier, standard spline groove shape having a single radius depth for use with an extruded spline as described in more detail below. Some of the insert device examples are also of the single hump configuration, though each includes both a seal portion and a spline portion, and some are of the two hump configuration.

As shown in a number of the foregoing examples, the edges of the annular body of the insert device may include spaced apart notches around the circumference of the device. The notches, i.e., relief notches, can aid in the insert device material spreading out during install on a mandrel without breaking.

Co-pending U.S. application Ser. Nos. 15/882,696 and 15/882,726, both filed on Jan. 29, 2018, and Ser. No. 16/134,561, filed on Sep. 18, 2018, are each incorporated in their entirety herein. Each discloses details and aspects of examples of the spline and the splined pipe joint noted above. In those applications, the spline grooves on the ID of the belled pipe are formed in the pipe material directly. In the examples disclosed herein, the spline grooves in the belled end of the pipe are formed in the insert device. The splines and groove shapes may vary, and particularly, may vary to at least include the examples in these co-pending applications. As noted above, an expandable spline, snap ring, retainer ring, or the like is received in the mating spline grooves of the belled polymer pipe and the joined second pipe, also a polymer pipe. The spline seats in both grooves preventing the two pipes from being separated in an axial direction, as described and shown in these co-pending applications. The spline can be expanded, while still residing in the spline groove of the belled pipe to allow separation of the two pipes. Some of the examples include a conventional rectangular spline groove, i.e., an extruded spline, that allows a spline to be inserted via a hole through the belled end of a pipe. The spline resides in the two grooves to prevent axial separation of the pipe joint. The spline can be withdrawn from the grooves through the hole to allow disassembly of the pipe joint.

Most of the insert devices disclosed and described herein are seal-less devices, providing only the spline groove function described above. The spline groove may be of the dual-depth type for a Certa-Lok® CLIC™ type spline. The insert devices may thus be used providing a pipe joint for a pipe system that does not require or provide a fluid tight seal. Alternatively, the pipe joint may again be provided with a separate, independent seal. In one example, the seal may be a traditional Rieber type seal. In another example, the seal may be a conventional O-ring type seal within a seal groove in one of the two pipes.

Depending on the style of pipe joint and the type of groove, the splines used in the disclosed examples may include an extruded spline with a generally square or rectangular cross-section. Such a spline will prevent disassembly of a pipe joint, unless the spline is removed by pulling it from the spline grooves, such as with a tool as is known in the art. Instead, the splines may include a portion that is angled, tapered, chamfered, or ramped in order to permit spigot insertion with the spline already in place. The disclosed insert devices may be utilized and designed accordingly to accommodate the desired type of spline and joint.

Although certain insert devices, pipe belled ends, pipe joint assemblies, and forming methods have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A polymer pipe comprising:
   a length between a first end and a second end, the length and the first end having a first diameter, and the second end being a belled end having a second diameter larger than the first diameter; and
   an insert device received within the second end, the insert device having an annular body and a spline groove formed in the annular body and facing radially inward,
   wherein the spline groove is a dual-depth groove with a first groove section having a shallower radial depth and a second groove section having a deeper radial depth,
   wherein the first groove section and the second groove section each have a surface arranged parallel to an axis of the polymer pipe such that the spline groove has a stepped configuration, and
   wherein a void is provided in the annular body facing radially inward in the same direction as the spline groove, the void extending circumferentially around the insert device and disposed axially between a tapered face of the annular body and the spline groove.

2. The polymer pipe of claim 1, further comprising one or more insert recesses formed in an inside diameter (ID) surface of the second end, the annular body seated in the one or more insert recesses.

3. The polymer pipe of claim 1, wherein the one or more insert recesses result from a belling process at the second end of the pipe.

4. The polymer pipe of claim 1, wherein the annular body is a molded element and wherein a material of the annular body is rigid.

5. The polymer pipe of claim 1, further comprising a second pipe joined to the polymer pipe, wherein the second pipe has one end installed in the second end of the polymer pipe to form a pipe joint assembly.

6. The polymer pipe of claim 5, wherein the second pipe has a mating spline groove on the OD surface that is axially aligned with the spline groove in the annular body of the insert device.

7. The polymer pipe of claim 6, further comprising a spline received in the spline groove and the mating spline groove to retain the polymer pipe and the second pipe joined to one another.

8. The polymer pipe of claim 1, wherein the annular body of the insert device is formed of a polymer material.

9. The polymer pipe of claim 1, wherein the insert device has an ID in a range of about 3 inches to about 48 inches and an axial length of about 0.125 inches to about 3 inches.

10. The polymer pipe of claim 1, wherein the annular body includes a spline portion including the spline groove.

11. A pipe joint assembly comprising:
    the polymer pipe according to claim 1;
    a second pipe having one end installed in the second end of the polymer pipe, the second pipe having a mating spline groove on an outside diameter (OD) surface that is axially aligned with the spline groove in the annular body of the insert device; and
    a spline received in the spline groove and the mating spline groove axially joining the polymer pipe and the second pipe.

12. The pipe joint assembly of claim 11, wherein the polymer pipe, the second pipe, the spline, and the insert device are each entirely non-metallic.

13. A method of assembling a pipe joint, the method comprising:
    providing a first pipe having a spigot end;
    providing a second pipe having a belled end, the belled end of the second pipe sized to receive therein the spigot end of the first pipe, wherein a mating spline groove is provided on an outside diameter (OD) of the first pipe;
    installing an insert device seated in and retained within the belled end, the insert device including an annular body defining a spline groove facing radially inward;
    inserting the spigot end of the first pipe into the belled end of the second pipe such that the mating spline groove is axially aligned with the spline groove in the annular body; and
    inserting a spline into the spline groove and the mating spline groove to axially retain the first and second pipes joined to one another,
    wherein the spline groove is a dual-depth groove with a first groove section having a shallower radial depth and a second groove section having a deeper radial depth, wherein the first groove section and the second groove section each have a surface arranged parallel to an axis of the pipe joint such that the spline groove has a stepped configuration whereby spline can selectively reside in the first groove section or the second groove section of the spline groove, and wherein a void is provided in the annular body facing radially inward in the same direction as the spline groove, the void extending circumferentially around the insert device and disposed axially between a tapered face of the annular body and the spline groove.

14. A pipe system comprising:

the polymer pipe according to claim 1;

one or more insert recesses formed in an inside diameter (ID) surface of the belled end of the polymer pipe; and the annular body of the insert device with an outside diameter (OD) surface seated in the one or more insert recesses.

15. The pipe system of claim 14, further comprising:

a second pipe having a spigot end installed in the belled end of the polymer pipe, the second pipe having a mating spline groove on an OD surface that is axially aligned with the spline groove in the annular body of the insert device; and a spline received in the spline groove and the mating spline groove, the spline axially joining the polymer pipe and the second pipe.

* * * * *